(12) United States Patent
Hoffmuller et al.

(10) Patent No.: US 8,964,296 B2
(45) Date of Patent: Feb. 24, 2015

(54) METHOD FOR PRODUCING A MICROSTRUCTURE ON A CARRIER

(75) Inventors: Winfried Hoffmuller, Bad Tolz (DE); Theodor Burchard, Gotting (DE); Michael Rahm, Bad Tolz (DE); Josef Schinabeck, Gmund (DE); Manfred Heim, Bad Tolz (DE); Andreas Rauch, Ohlstadt (DE); Christian Fuhse, Otterfing (DE)

(73) Assignee: Giesecke & Devrient GmbH, Munich (DE)

( * ) Notice: Subject to any disclaimer, the term of this patent is extended or adjusted under 35 U.S.C. 154(b) by 294 days.

(21) Appl. No.: 13/696,479

(22) PCT Filed: May 5, 2011

(86) PCT No.: PCT/EP2011/002251
§ 371 (c)(1),
(2), (4) Date: Nov. 6, 2012

(87) PCT Pub. No.: WO2011/138039
PCT Pub. Date: Nov. 10, 2011

(65) Prior Publication Data
US 2013/0063826 A1 Mar. 14, 2013

(30) Foreign Application Priority Data
May 7, 2010 (DE) .......................... 10 2010 019 766

(51) Int. Cl.
*G02B 27/10* (2006.01)
(52) U.S. Cl.
USPC .......................................... 359/619; 359/618
(58) Field of Classification Search
USPC ........... 359/618–621, 454–456, 443; 264/1.1, 264/1.32, 2.7
See application file for complete search history.

(56) References Cited

U.S. PATENT DOCUMENTS 6,474,695 B1   11/2002   Schneider et al.
7,517,578 B2   4/2009    Raksha et al.
(Continued)

FOREIGN PATENT DOCUMENTS

CN       101160219 A        4/2008
DE   10 2004 035 979 A1    2/2006
(Continued)

OTHER PUBLICATIONS

Hutley, M.G. et al., "The moire magnifier," Pure Appl. Opt. 3 (1994)133-142, Printed in the UK, IOP Publishing Ltd.
(Continued)

*Primary Examiner* — Thomas K Pham
*Assistant Examiner* — Sharrief Broome
(74) *Attorney, Agent, or Firm* — Workman Nydegger

(57) ABSTRACT

A method for producing a microstructure on a carrier by: (a) manufacturing a donor foil by forming an embossed structure with elevations and depressions in a first foil material and applying a transfer layer to the embossed structure, (b) manufacturing an acceptor foil by applying an adhesive layer to a second foil material, (c) laminating the donor foil and the acceptor foil by means of the adhesive layer, the transfer layer on the elevations of the embossed structure bonding to the adhesive layer, and (d) transferring the bonded regions of the transfer layer to the acceptor foil by separating the donor foil and the acceptor foil from each other, thereby forming in the acceptor foil a first microstructure from the transferred regions of the transfer layer, and/or forming in the donor foil a second microstructure complementary to the first microstructure.

25 Claims, 21 Drawing Sheets

(56) References Cited

U.S. PATENT DOCUMENTS

| | | |
|---|---|---|
| 7,728,931 B2 | 6/2010 | Hoffmuller |
| 8,241,732 B2 | 8/2012 | Hansen et al. |
| 8,685,488 B2 | 4/2014 | Hoffmuller et al. |
| 2006/0005606 A1 | 1/2006 | Hatanaka et al. |
| 2006/0072225 A1 | 4/2006 | Schilling et al. |
| 2007/0216518 A1 | 9/2007 | Hoffmuller |
| 2008/0014378 A1 | 1/2008 | Hoffmuller et al. |
| 2008/0024846 A1 | 1/2008 | Tompkin et al. |
| 2008/0160226 A1* | 7/2008 | Kaule et al. .......... 428/29 |
| 2009/0008923 A1 | 1/2009 | Kaule et al. |
| 2010/0151207 A1 | 6/2010 | Hansen et al. |
| 2010/0182221 A1 | 7/2010 | Kaule et al. |
| 2010/0194532 A1 | 8/2010 | Kaule |
| 2010/0197094 A1 | 8/2010 | Kim et al. |
| 2010/0307705 A1 | 12/2010 | Rahm et al. |
| 2011/0027538 A1 | 2/2011 | Hoffmann et al. |
| 2011/0045248 A1 | 2/2011 | Hoffmuller et al. |
| 2011/0115212 A1 | 5/2011 | Hoffmuller et al. |
| 2011/0127762 A1 | 6/2011 | Hoffmuller et al. |
| 2012/0319395 A1 | 12/2012 | Fuhse et al. |

FOREIGN PATENT DOCUMENTS

| | | |
|---|---|---|
| DE | 10 2005 062 132 A1 | 7/2007 |
| DE | 10 2006 032 660 A1 | 1/2008 |
| DE | 10 2007 029 203 A1 | 1/2009 |
| DE | 10 2007 062 089 A1 | 7/2009 |
| DE | 10 2008 036 480 A1 | 2/2010 |
| DE | 10 2008 036 481 A1 | 2/2010 |
| EP | 0 064 067 A1 | 11/1982 |
| EP | 0 330 733 A1 | 9/1989 |
| EP | 0 868 313 B1 | 4/2000 |
| EP | 1 562 758 A1 | 8/2005 |
| EP | 1 570 422 A1 | 9/2005 |
| EP | 2 065 214 A1 | 6/2009 |
| EP | 1 782 108 B1 | 2/2011 |
| WO | 82/01595 A1 | 5/1982 |
| WO | 97/19821 A1 | 6/1997 |
| WO | 99/13157 A1 | 3/1999 |
| WO | 2004/048119 A1 | 6/2004 |
| WO | 2004/049250 A1 | 6/2004 |
| WO | 2005/052650 A2 | 6/2005 |
| WO | 2006/013215 A1 | 2/2006 |
| WO | 2007/076952 A2 | 7/2007 |
| WO | 2007/140887 A2 | 12/2007 |
| WO | 2009/000527 A1 | 12/2008 |
| WO | 2009/000528 A1 | 12/2008 |
| WO | 2009/000529 A2 | 12/2008 |
| WO | 2009/083146 A2 | 7/2009 |
| WO | 2009/083151 A1 | 7/2009 |
| WO | 2009/121578 A2 | 10/2009 |
| WO | 2011/066990 A2 | 6/2011 |
| WO | 2011/066991 A2 | 6/2011 |

OTHER PUBLICATIONS

German Search Report in 10 2010 019 766.1, dated May 7, 2010.
International Search Report in PCT/EP2011/002251, dated Aug. 12, 2011.
International Preliminary Report on Patentability in PCT/EP2011/002251, dated Nov. 13, 2012.

* cited by examiner

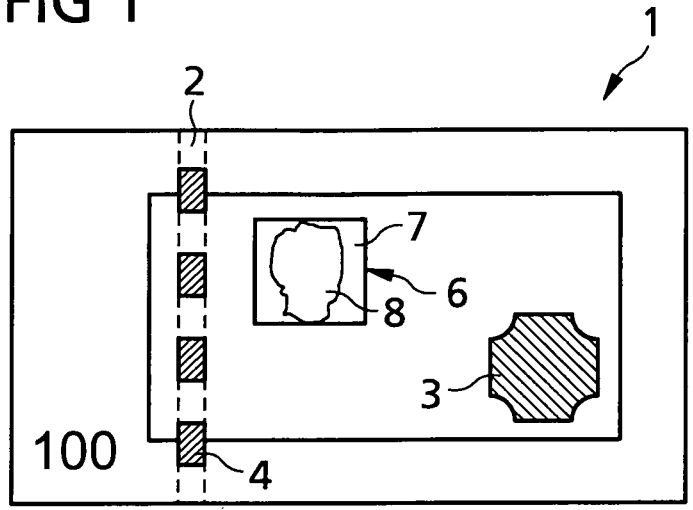
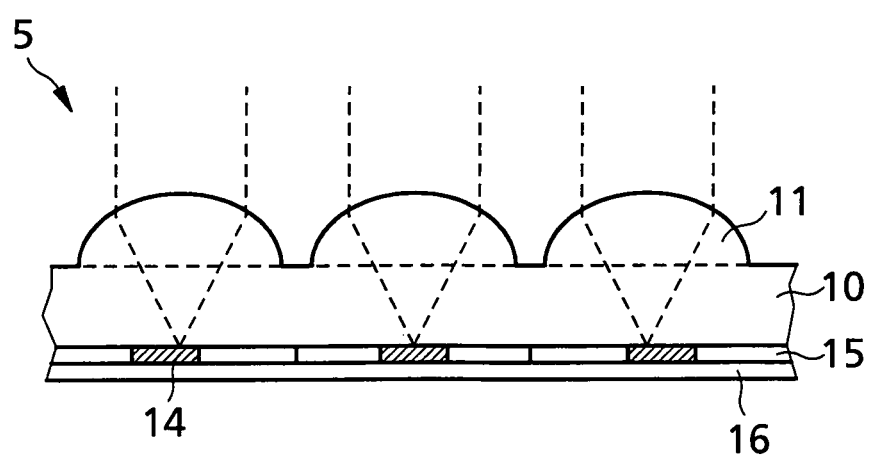

FIG 3
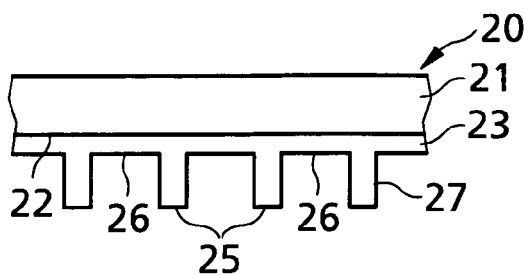
a)
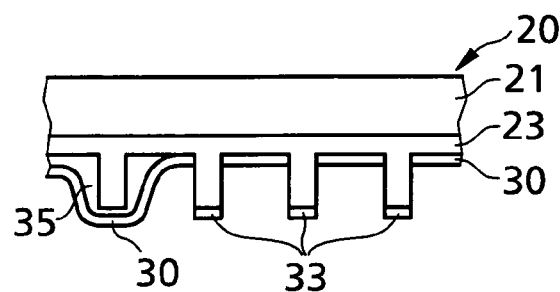
b)
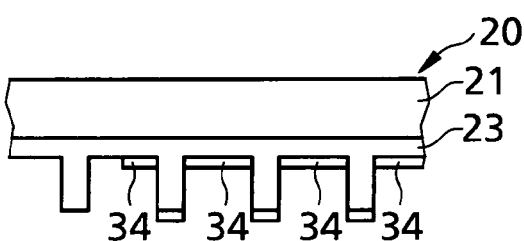
c)
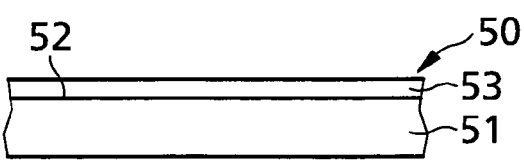
d)
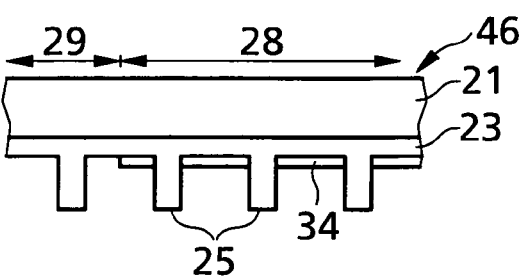
e)
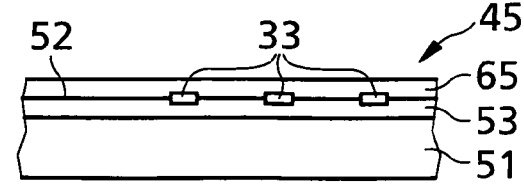
f)

FIG 4
a)
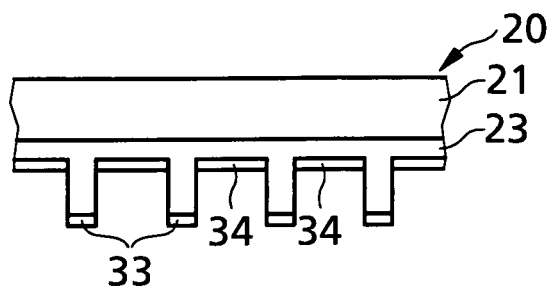
b)
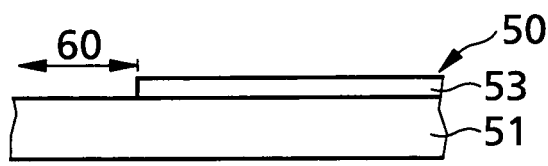
c)
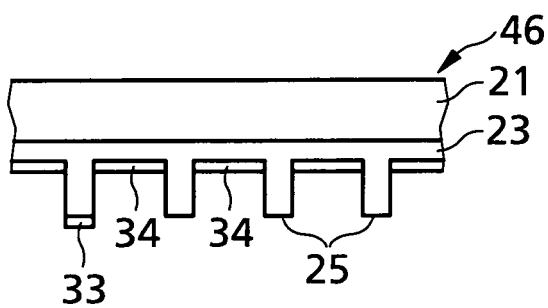
d)
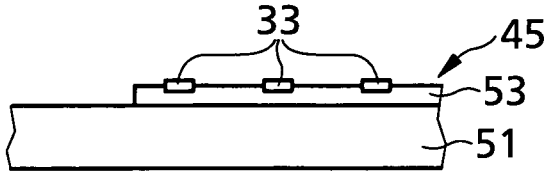

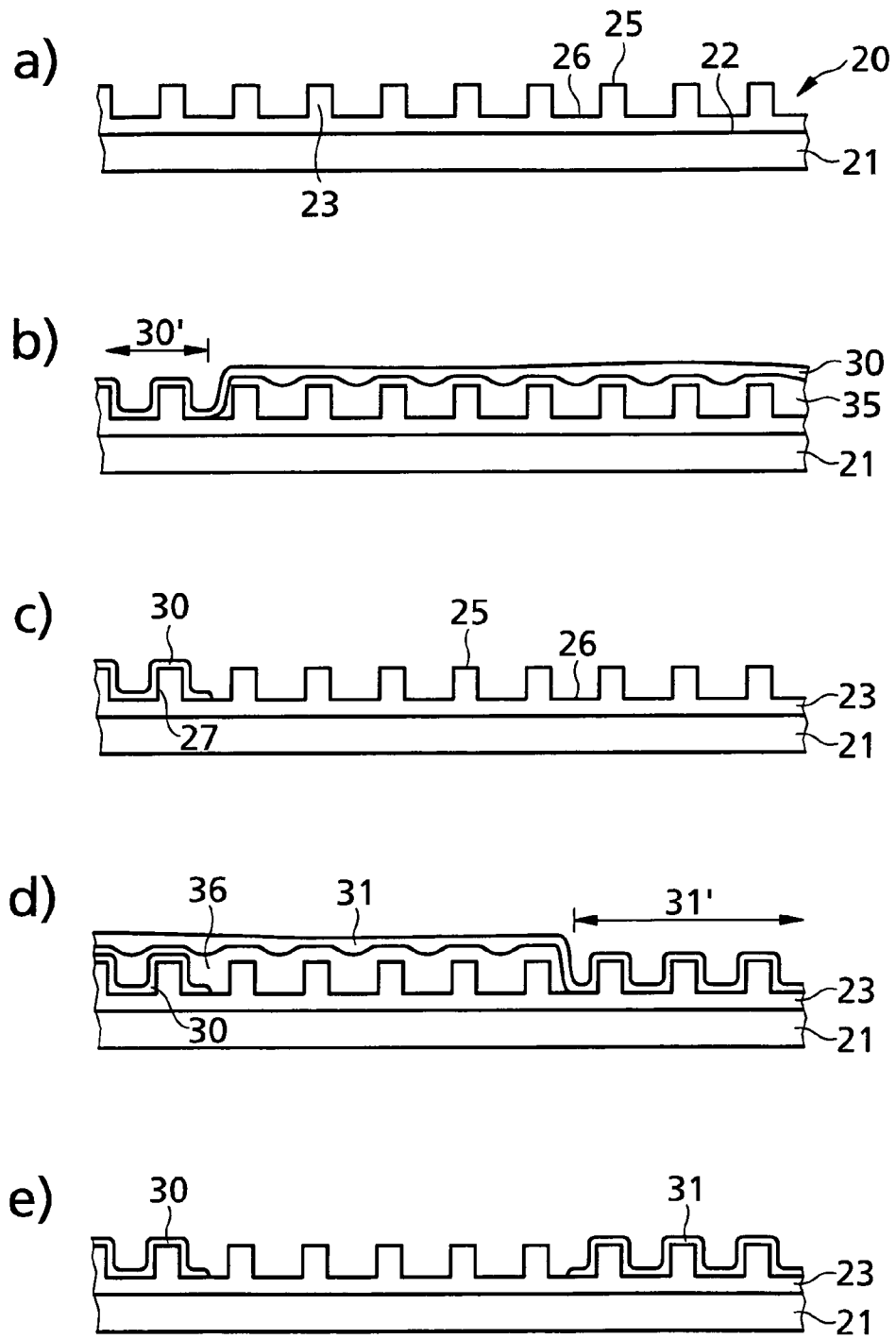

FIG 5
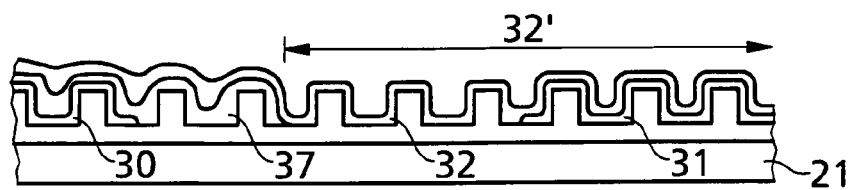
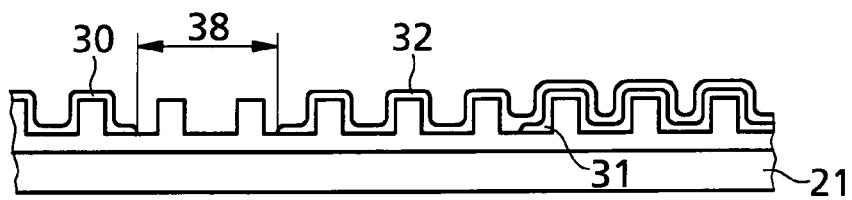
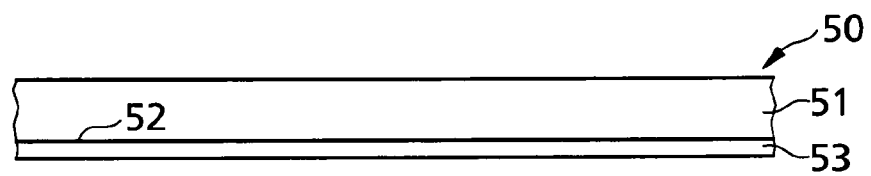
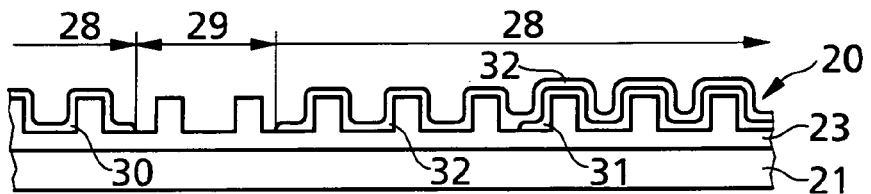
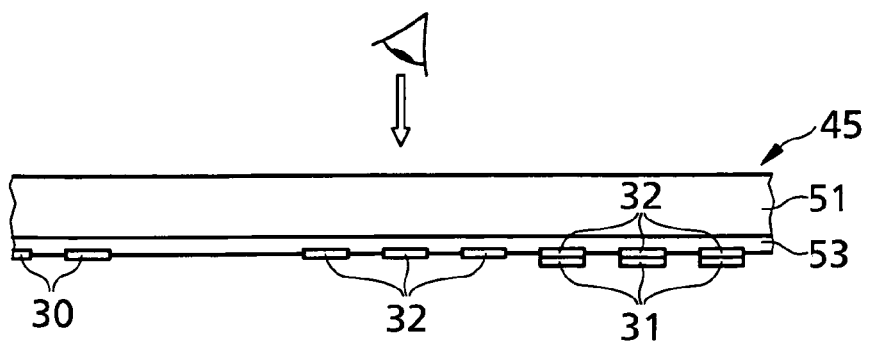
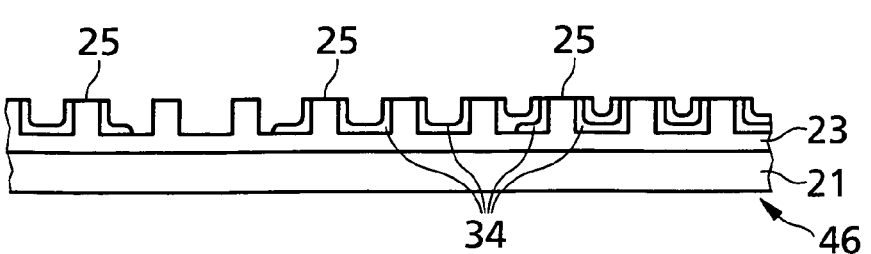

FIG 6
a)
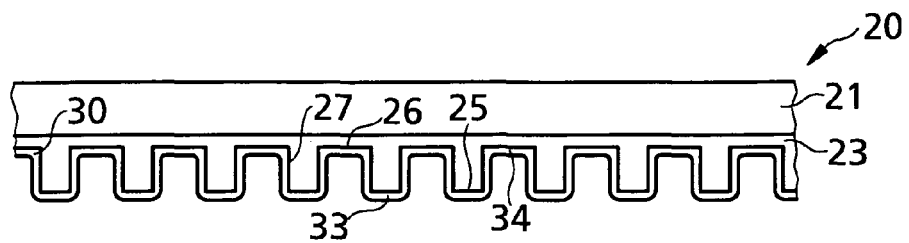
b)
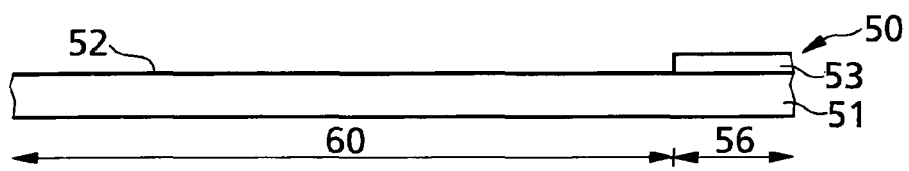
c)
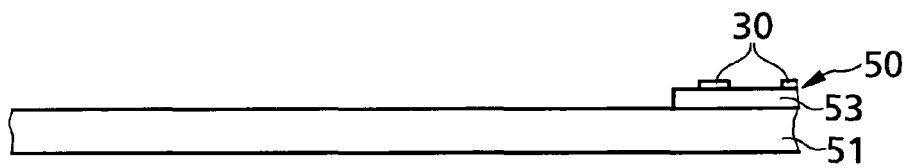
d)
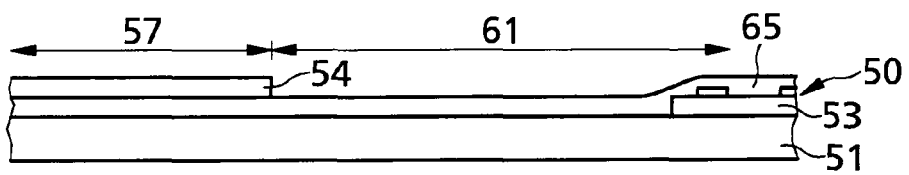
e)
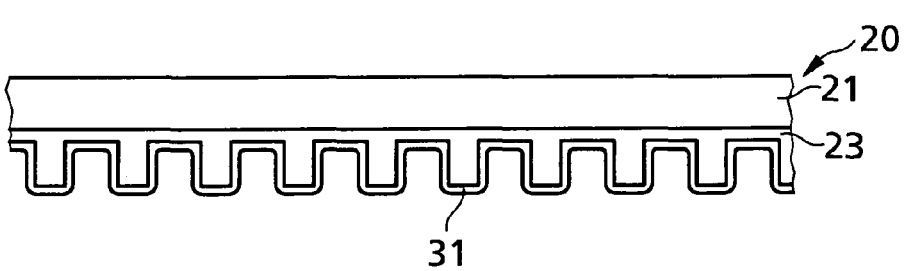
f)
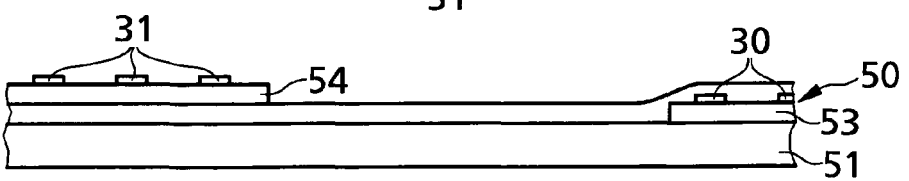
g)
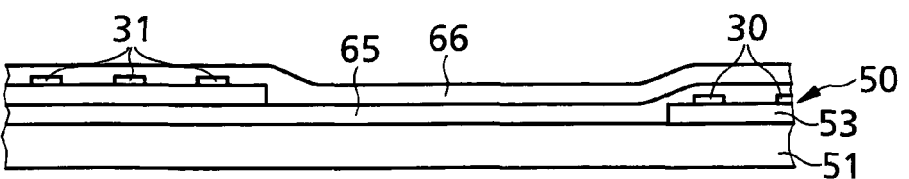

FIG 6
h)
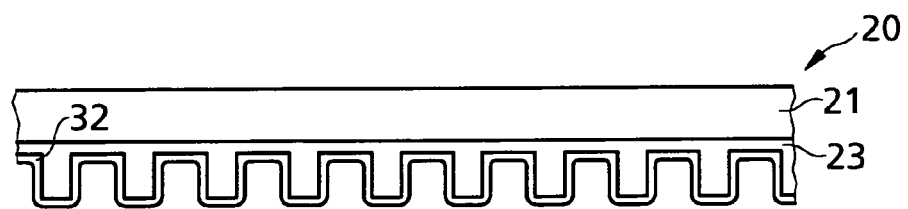
i)
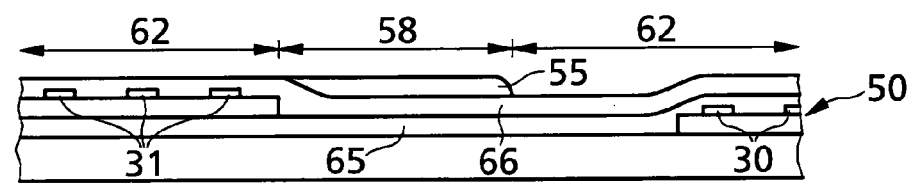
k)
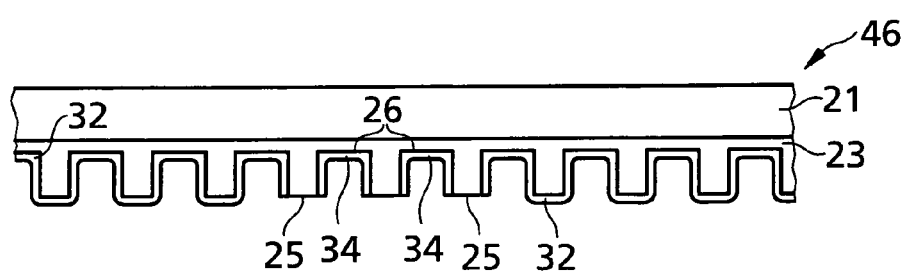
l)
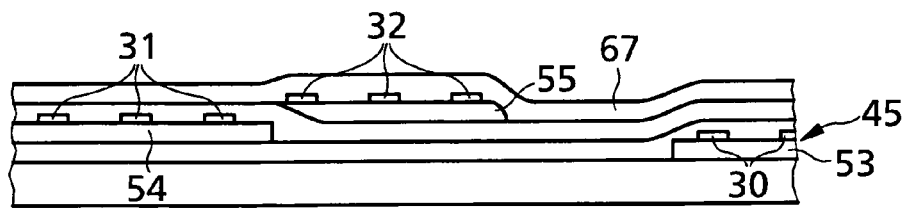

FIG 7
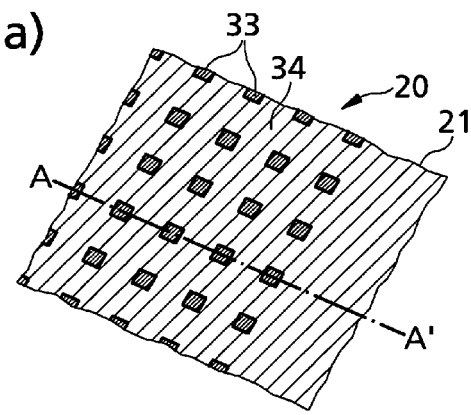
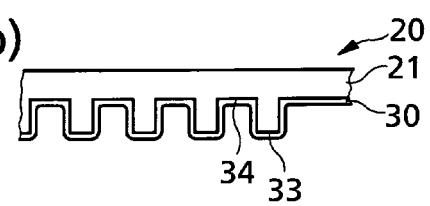
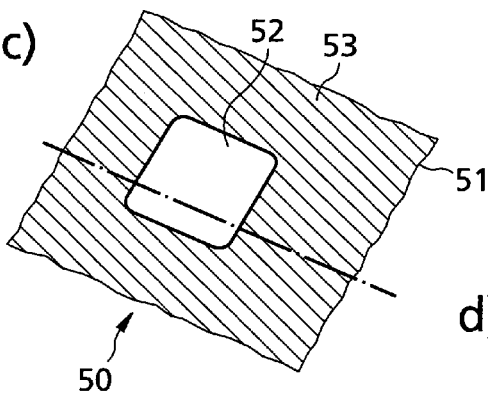
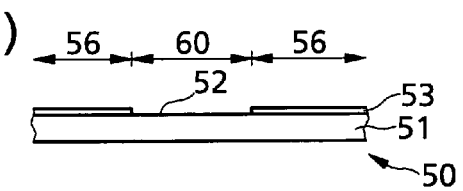
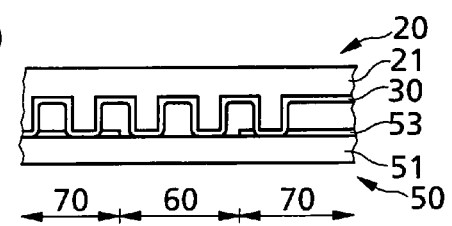

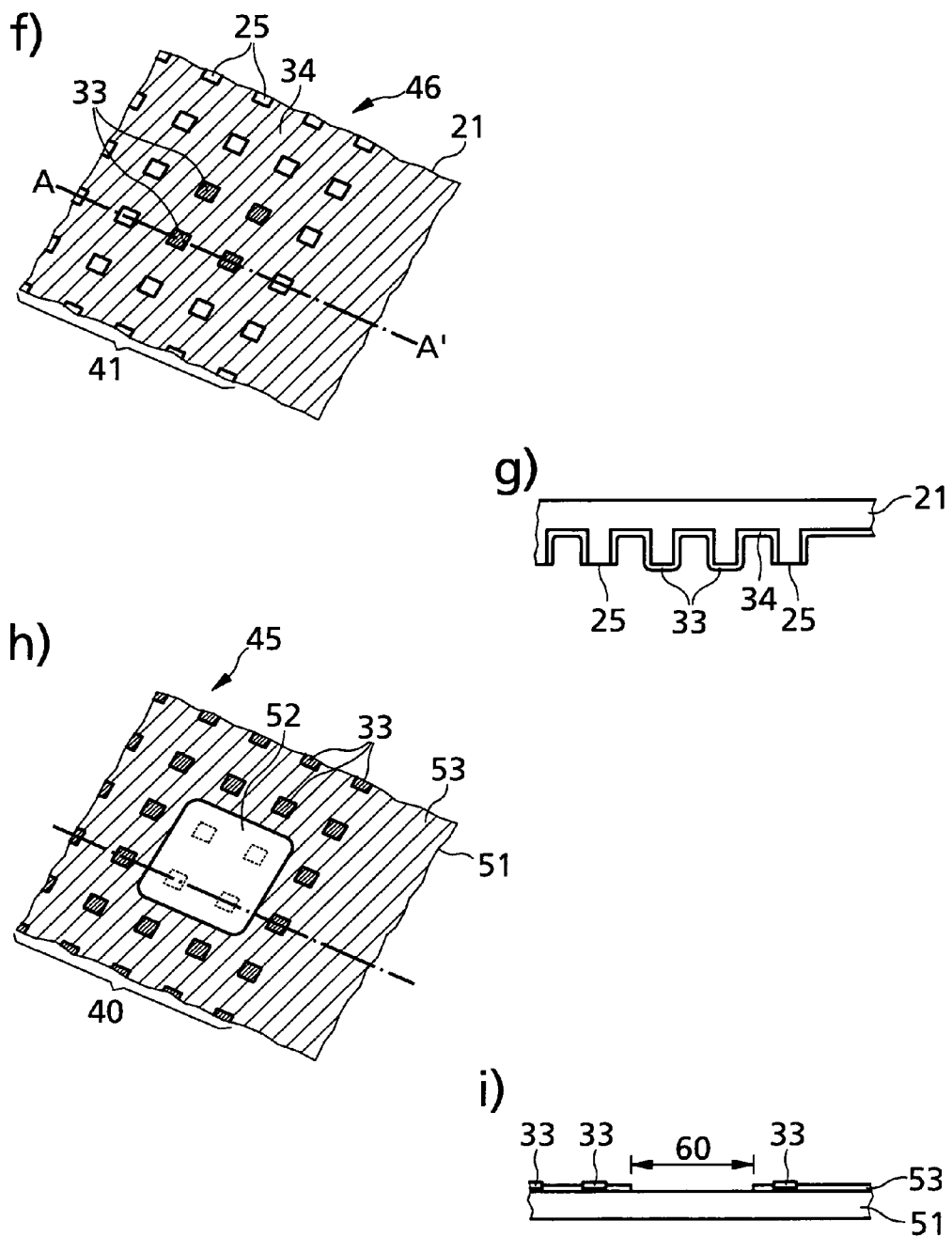

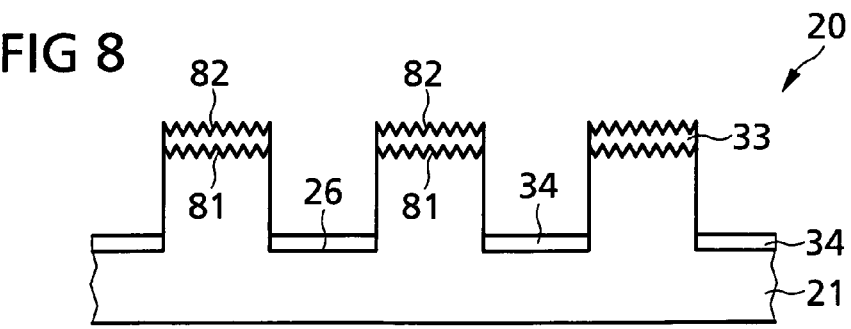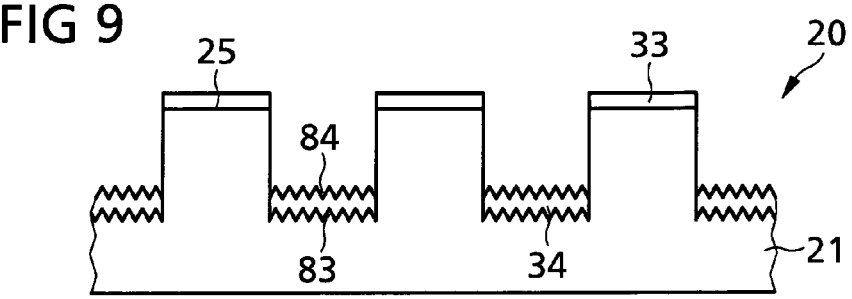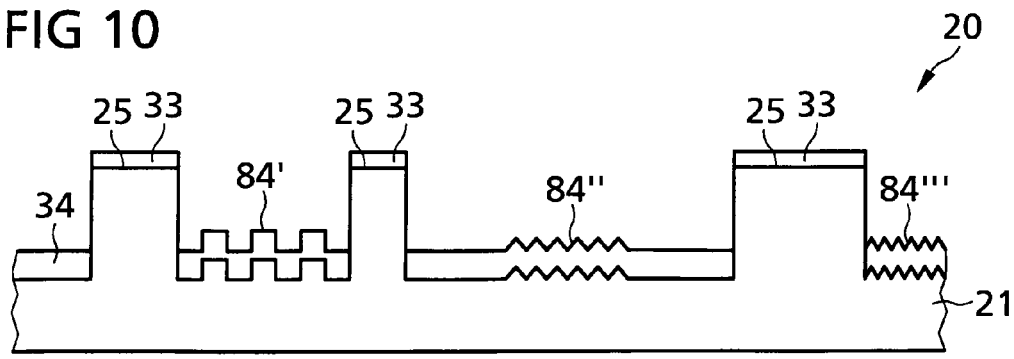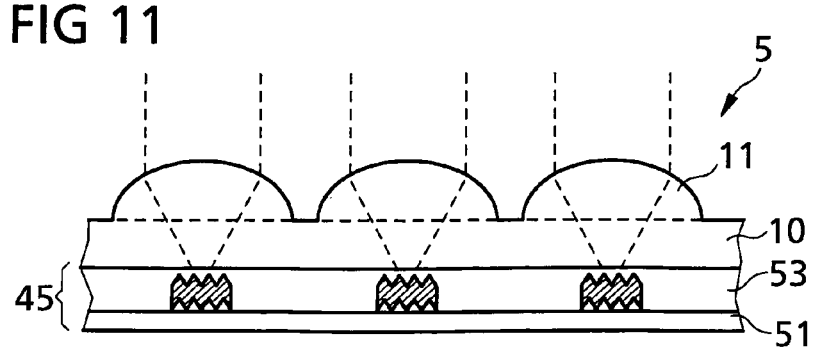

FIG 16
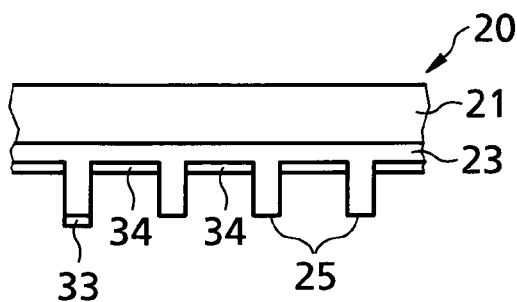
a)
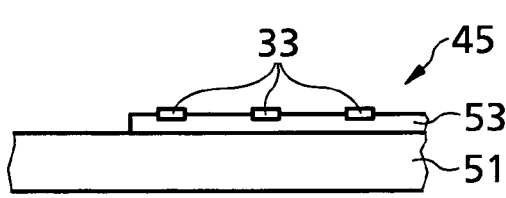
b)
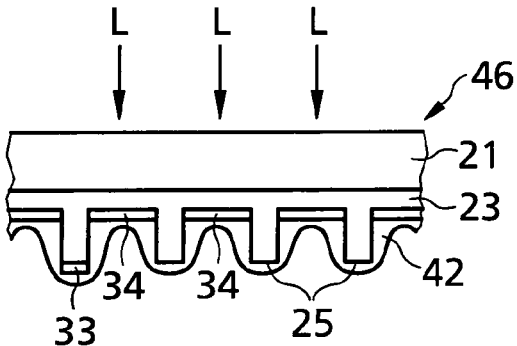
c)
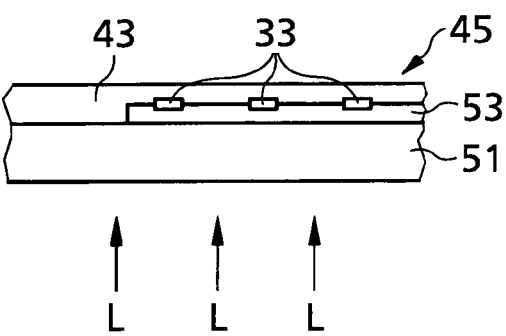
d)
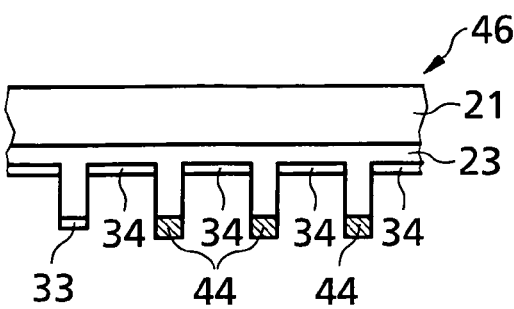
e)

FIG 16
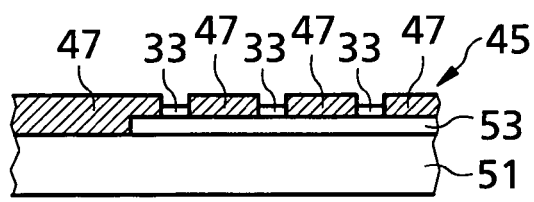
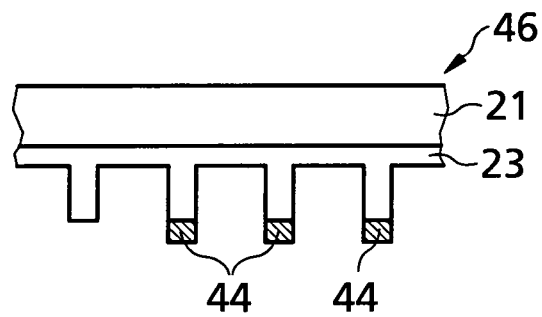
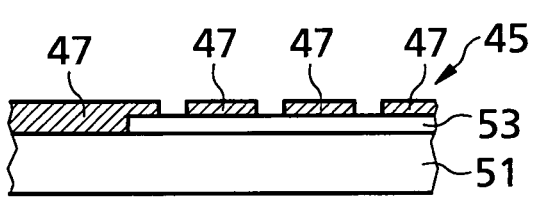
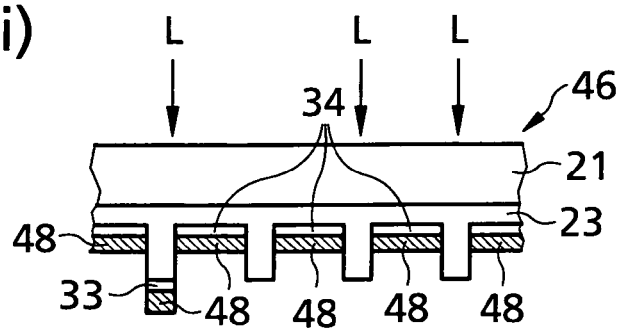
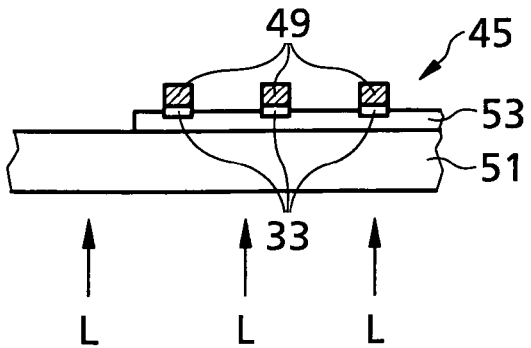

FIG 17
a) 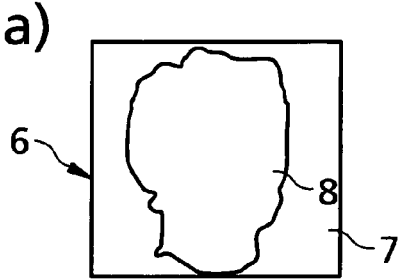
b) 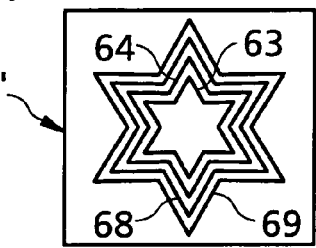
FIG 18
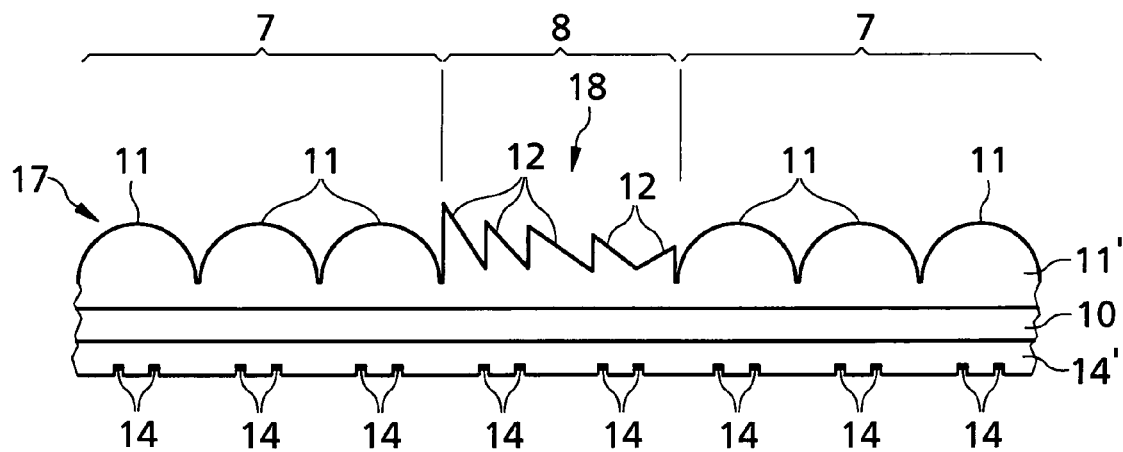
FIG 19
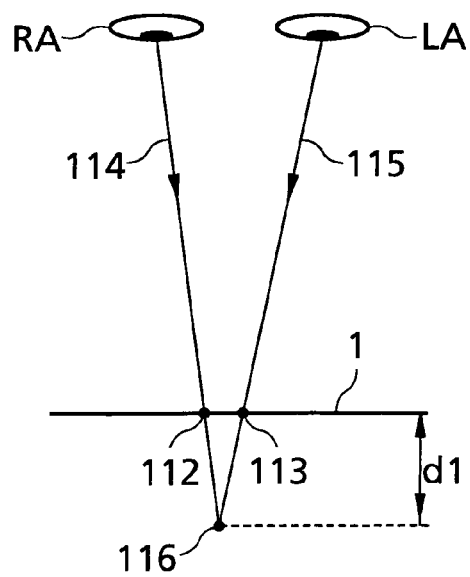

FIG 26
a)
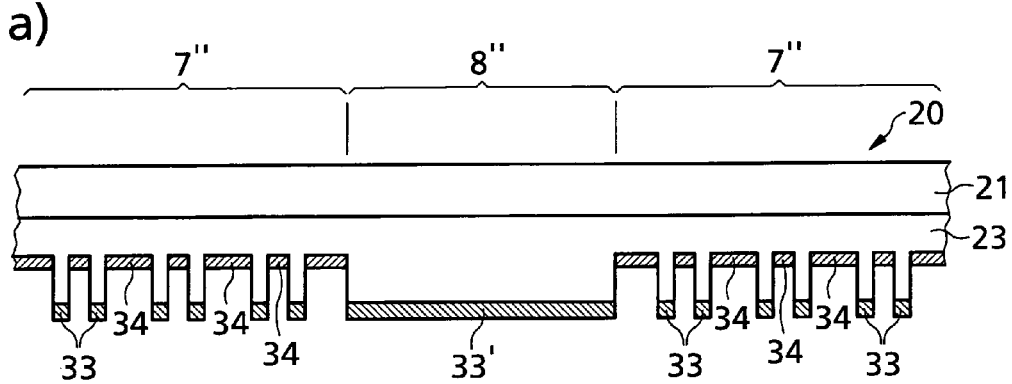
b)
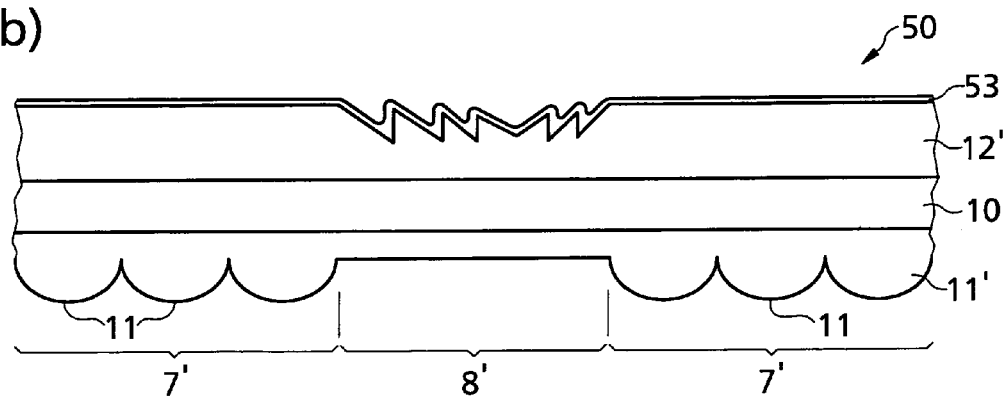
c)
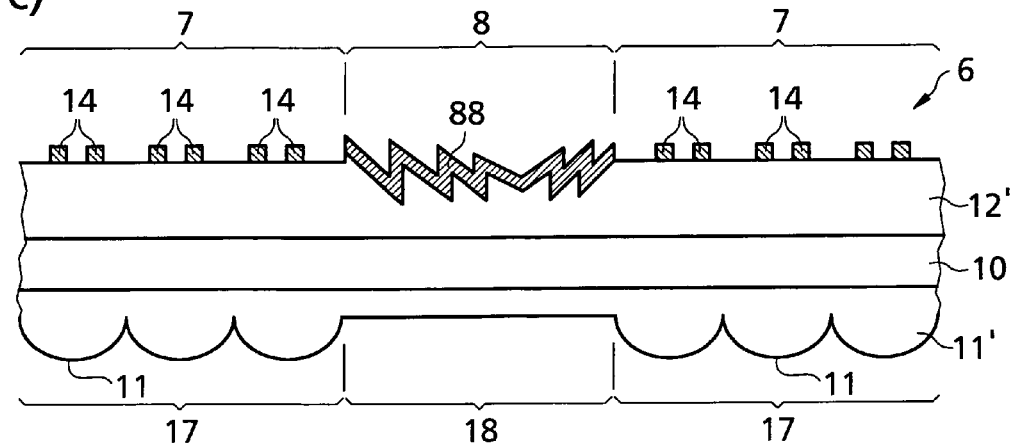

FIG 27
a)
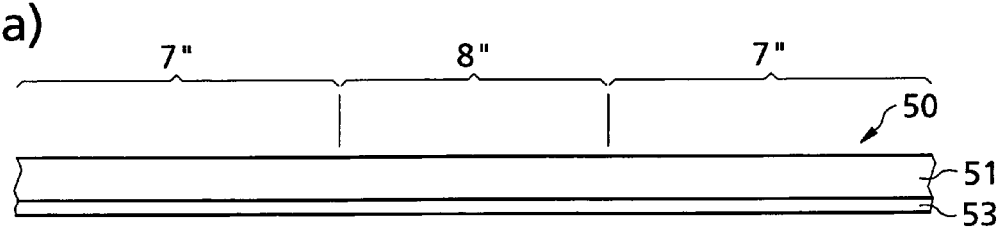
b)
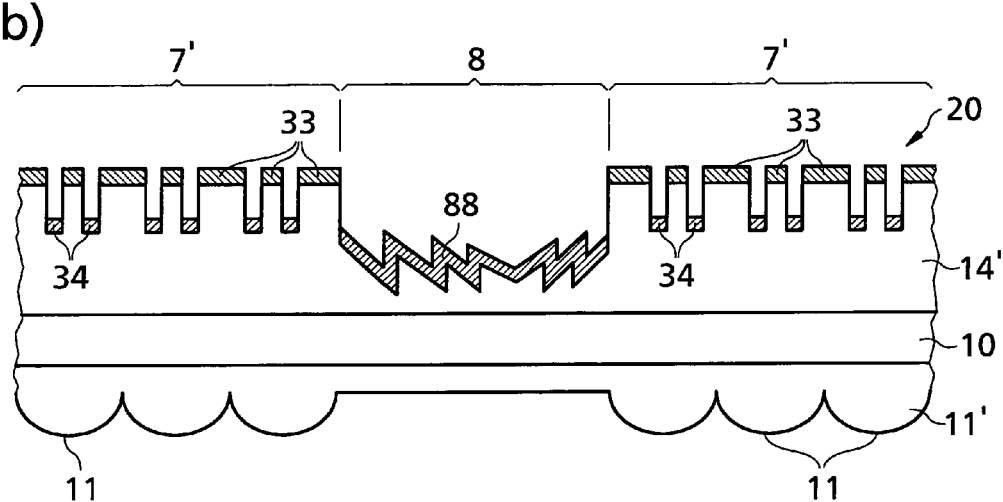
c)
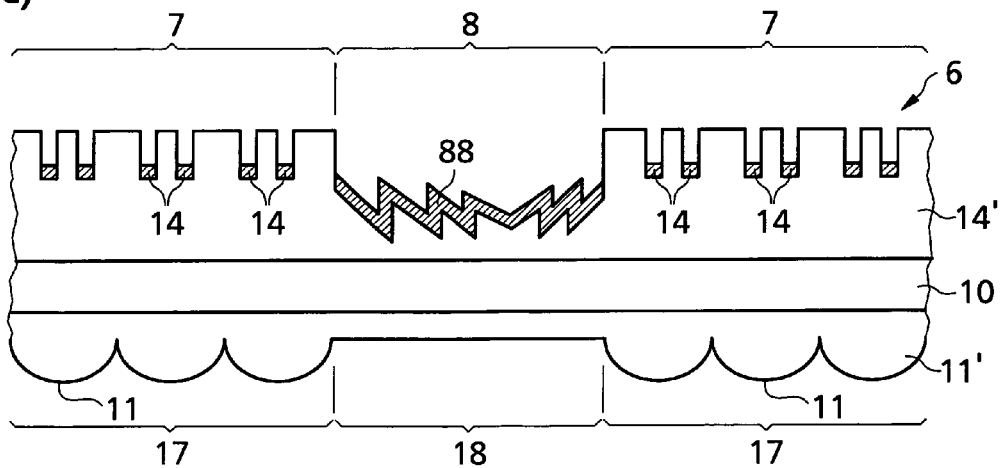

US 8,964,296 B2

METHOD FOR PRODUCING A MICROSTRUCTURE ON A CARRIER

BACKGROUND OF THE INVENTION

A. Field of the Invention

The subject matter of the present invention is a method for producing a microstructure on a carrier, the employment of a microstructure carrier obtainable by the method as a component of a security element, wherein the microstructure carrier can be employed alone or as part of a micro-optic representation arrangement, and wherein the microstructure carrier can provide the micromotif or the micromotif viewing device. The subject matter of the present invention is also a security element having at least one microstructure carrier obtainable by the method according to the invention, the microstructure carrier preferably being part of a micro-optic representation arrangement, as well as a product such as a data carrier or branded article which is equipped with the security element according to the invention.

Data carriers, such as value documents or identity documents, but also other objects of value, such as branded articles for instance, are often provided for safeguarding purposes with security elements which permit a verification of the authenticity of the data carrier and which at the same time serve as protection from unauthorized reproduction. The security elements can be configured for example in the form of a security thread embedded into a bank note, of a cover foil for a bank note having a hole, of an applied security strip, or of a self-supporting transfer element which after its manufacture is applied to a value document.

A special role is played here by security elements having optically variable elements which convey a different pictorial impression to the viewer from different viewing angles, because they cannot be reproduced even with high-quality color copiers. The security elements can be equipped for this purpose with security features in the form of optically-diffractively active micro- or nanostructures, such as, for instance, with conventional embossed holograms or other hologram-like diffractive structures, as are described for example in the prints EP 0 330 733 A1 or EP 0 064 067 A1.

For some time, so-called moiré magnification arrangements have also been used as security features. The basic manner of functioning of such moiré magnification arrangements is described in the article "The moire magnifier", M. C. Hutley, R. Hunt, R. F. Stevens and P. Savander, Pure Appl. Opt. 3 (1994), pp. 133-142. To put it briefly, moiré magnification accordingly designates a phenomenon occurring upon the viewing of a grid of identical picture objects through a lenticular grid having approximately the same grid measure. As with every pair of similar grids, there results here a moiré pattern consisting of a periodic arrangement of magnified and, where applicable, rotated pictures of the elements of the picture grid.

The lattice period and the diameter of the picture objects lie in the same order of magnitude here as those of the microlenses of the lenticular grid. The picture objects should be unrecognizable with the naked eye. The smaller the structures are configured, the greater the forgery resistance is.

Due to the small size of the structures, all methods for producing the picture objects (micromotif elements) in which application methods such as printing methods play a relevant role for the attainable dimensions are little suited. The attainable minimum size of the micromotif elements is limited by the resolving power of the application method. This holds equally for methods in which the microstructures are produced by direct imprinting, as well as for all methods in which the manufacture of the microstructures includes some method step with limited resolving power, for example the applying of a photoresist. With directly imprinted microstructures, the maximally obtainable ink layer thickness is moreover limited due to the high lateral resolution, thereby limiting the maximally attainable contrast.

Microstructures or micromotif elements are hence preferably manufactured employing embossed structures. Embossings can be produced in very high resolution.

From WO 2009/121578 there is known a method for producing a micro-optic representation arrangement wherein an embossed structure is produced in a carrier and the embossed depressions are filled with ink. The ink in the depressions forms the micromotif elements, while the excess ink is scraped off. In this method a toning film remains behind, however, which limits the maximally obtainable contrast.

From WO 2009/083146 there is known a method for producing a microstructure wherein an embossed structure is produced, and either only the elevations or only the depressions of the embossed structure are covered with an imprinting substance or filled with an imprinting substance. The imprinting substance must be chosen to be of accordingly high viscosity so as to only adhere to the elevations of the embossed structure, or be chosen to be of accordingly low viscosity so as to only fill the depressions of the embossed structure. To achieve the desired selective application, the viscosity of the imprinting substance and the transfer conditions must be precisely coordinated with each other.

The prior art hitherto does not make it possible to produce microstructures for micro-optic representation arrangements in a simple manner and in the desired quality. An additional problem occurring in particular with metallized microstructures is that, for many metals, there are no simple and satisfactory methods for "coarse structuring", i.e. it is impossible, or difficult, to realize structurings such as for example multicoloredness or negative scripts.

SUMMARY OF THE INVENTION

On these premises, the present invention is based on the object of avoiding the disadvantages of the prior art, and in particular of providing an advantageous method for manufacturing a microstructure that fulfills the requirements for a motif for micro-optic representation arrangements, in particular for micro-optic magnification arrangements. These requirements are a high resolution of the micromotif, i.e. small dimensions of the micromotif elements, contrast richness and contour sharpness in the microscopic range, as well as the possibility of a macroscopic structuring, if possible independently of the material of the micromotif elements.

The invention is based on the discovery that it is possible to coat embossed structures over the full area, i.e. to coat the elevations as well as the depressions of an embossed structure as well as the regions between elevations and depressions, to then bond the coated embossed structure under pressure with a carrier material equipped with an adhesive layer, to separate the embossed structure from the adhesive-coated carrier again, and, in so doing, to transfer exclusively the coating from the elevations of the embossed structure to the adhesive-coated carrier. Surprisingly, the coating thereby breaks precisely and in sharp-edged fashion, so that there can be obtained contrast-rich microstructures with small dimensions and high precision which are excellently suited for micro-optic viewing arrangements.

A special advantage of the method lies in the many degrees of freedom and possibilities of variation that it offers. Such an advantage is the possibility of superimposing microscopic and macroscopic structures, also employing coatings that cannot readily be structured macroscopically. This combination of macroscopic and microscopic structuring is obtained by the interaction of a microscopically structured microstructure carrier and a macroscopically structured motif carrier. Upon the transfer of the microstructure to the macroscopically structured motif carrier there arise complementary microstructures on the two carriers. Another advantage of the method according to the invention is that the microstructure can be structured further, for example by diffractive structures or other nanostructurings. A further advantage is that the dimensions of the regions of the coating that are to be transferred can without any problems be so chosen that each of the two starting materials (donor foil and acceptor foil) comes into consideration as the microstructure carrier. Furthermore, each of the two starting materials which respectively has transparent places after the transfer (if a transparent carrier material is employed) can also serve as a micro-optic viewing device in place of a lens arrangement.

Special embodiments of the invention have further advantages as well:

Thus, the microstructures of a microstructure carrier can be employed for structuring a further, preferably colored, layer. For this purpose, a microstructure carrier is equipped with a photoactive layer, i.e. a layer of a material changeable by irradiation, such as a photoresist, and irradiated through the (original) microstructures, i.e. the (original) microstructures are employed as an irradiation mask. After irradiating, detaching of the soluble regions of the photoactive layer, and, where applicable, detaching of the original microstructures, there is obtained a microstructure carrier having microstructures of photoactive material besides the original microstructures, or exclusively microstructures of photoactive material, or combined microstructures of congruent original microstructures and microstructures of photoactive material.

The microstructure carriers are preferably combined with micro-optic viewing devices, in particular with microfocusing element arrangements, such as microlens arrangements or concave micromirror arrangements, into micro-optic representation arrangements. Such micro-optic representation arrangements are especially striking and easy to remember when they have a combination of at least two representation arrangements that behave differently upon viewing from different angles of view. Such combinations are for example a first representation arrangement presenting as a first motif or a first motif portion at least two different pictures depending on the viewing angle, there resulting for a viewer a stereographic representation of an object with absolute depth information, in combination with a second representation arrangement presenting as a second motif or a second motif portion a reflective surface, there resulting for the viewer a representation with directional reflection. Combination representation arrangements of this kind and the effects attainable therewith are described in detail in the applications PCT/EP 2010/007368 and PCT/EP 2010/007369, and will be described more closely hereinafter in particular with reference to FIGS. 17 to 27. The motifs or motif portions of the micro-optic combination representation arrangements can be produced simultaneously in simple fashion by means of the method according to the invention.

Microstructures for micro-optic representation arrangements which provide stereographic representations with absolute depth information, such as moiré magnification arrangements, magnification arrangements of the moiré type and modulo magnification arrangements, are frequently manufactured by embossing into a carrier and filling the embossed depressions with ink. The excess ink is scraped off, but leaves a toning film (WO 2009/121578). This limits the maximally attainable contrast, on the one hand, and makes it difficult to dye the background with a desired (different) color, presumably due to the residual toning, on the other hand.

Using the method according to the invention, the background can be dyed in a certain color or in several colors without any problems. Such coloring not only increases the attractiveness of the representation, but also leads to a contrast enhancement, particularly with metallic microstructures. When the background is designed in multicolored fashion, there necessarily arise static elements in comparison to which the moiré-magnified or modulo-magnified elements move upon tilting of the micro-optic representation arrangement.

The contrast between colored background and microstructures or micromotif elements can be increased even further when the color of the background is backed with a reflective layer. This considerably increases the luminance of the color, the effect being especially advantageous in particular with colors that do not cover well.

When the reflective layer is applied only in certain regions, there arises upon employment of a transparent carrier material a contrast that is low in plan viewing and strong in transmission between regions with a reflective layer and regions without a reflective layer. In transmission the regions without a reflective layer can appear transparent.

Like the reflective layer, the background color can also be applied over the full area or only in certain regions. When the background color is absent in certain regions, a reflective coating applied there is directly visible.

In the method according to the invention for producing a microstructure on a carrier, a coating donor foil is first manufactured by equipping a first foil material with an embossed structure in the shape of the microstructure arrangement, and applying a coating to the embossed structure. The coating can be applied to the total embossed structure or only to a certain partial region thereof. However, in any case the coating is present in the relevant region/partial region over the full area, i.e. the shape of the coating replicates the embossed structure. This does not mean that the same amount of coating material must be respectively present on elevations, depressions and flanks of the elevations. Typically, the thickness of the coating is substantially greater on the elevations and in the depressions of the embossed structure than on the flanks of the elevations, on which there is usually only little coating material. How thick the coating on the flanks actually is depends on several factors, inter alia, on how strongly rounded the embossed structure is and on the angle at which the coating is applied, for example on the angle at which a metal is vapor-deposited.

Next, a coating acceptor foil is manufactured by applying an adhesive layer to a second foil material over the full area or over part of the area.

The donor foil and the acceptor foil are now brought together such that the two surfaces with the coating and the adhesive layer, respectively, are in contact with each other, and pressed together under suitable conditions such that the coating regions on the elevations of the embossed structure bond to the adhesive layer of the acceptor foil.

Last, the donor foil and the acceptor foil are separated from each other again, for example by separation winding. In so doing, the coating of the donor foil adheres to the acceptor foil in the bonded regions, and from the acceptor foil there arises a first microstructure carrier whose microstructure exactly reflects the microstructure of the elevations of the donor foil.

With an acceptor foil having the adhesive layer applied over only part of the area, this of course only holds for the corresponding partial areas. From the donor foil there arises a second microstructure carrier which is complementary to the first microstructure carrier, i.e. the two microstructure carriers behave like positive and negative with regard to the coating.

First, the manufacture of the donor foil will be explained more closely. The donor foil has a first foil material which can basically be chosen relatively arbitrarily, consisting for example of paper or plastic. Preferred are plastic foils, for example of polypropylene, polyethylene, polystyrene, polyester, in particular of polycarbonate or polyethylene terephthalate. Transparent or translucent foils are particularly preferred. Either an embossable foil must be employed, or the foil must be equipped with an embossable coating on one of its surfaces. Suitable embossable foils and embossable coatings are known to a person skilled in the art. Especially well suited are thermoplastics, cross-linkable thermoplastics and embossing lacquers such as UV lacquers. The embossable coating can be applied over the full area or for example also in the form of a motif.

The foil material or the embossable layer located thereon is provided with the desired microstructure in the form of an embossed motif under elevated pressure and, where applicable, elevated temperature and, where applicable, under the action of UV radiation. As an embossing tool there can be used for example an embossing cylinder or another embossed foil. Embossing is carried out in the regions of the foil material where the later microstructure carrier is to have a microstructure. Because the microstructure is intended primarily for manufacturing the motif layer of a micro-optic representation arrangement or for manufacturing a micro-optic motif viewing device, the microstructure preferably has microstructure elements with a line width between about $0.5\ \mu m$ and about $10\ \mu m$ and/or with a structure depth between about $0.2\ \mu m$ and about $20\ \mu m$, preferably between about $1\ \mu m$ and about $10\ \mu m$. The microstructures can of course also contain areal regions, and they can have positive elements as well as negative elements. The elevations and depressions can also form at least partly a contiguous network.

The desired coating, the transfer layer, is applied to the embossed structure over the full area or over part of the area. In so doing, it is to be heeded that the transfer layer must be partly detached again later. Hence, it must not adhere to the ground too strongly, in any case less strongly than the attainable adhesive force with the adhesive to be used later. A sufficiently low adhesive force can already be achieved, where applicable, by a suitable choice of the materials for the embossing foil or the embossable coating. However, the ground is preferably pretreated in adhesion-reducing fashion. For example, the ground can be washed off with water and/or solvents with or without suitable additives. Suitable as corresponding additives are for example surface-active substances, defoamers or thickeners. Additives can also be incorporated into the embossing foil or the embossable coating itself. Alternatively, an additional adhesion-reducing layer can also be provided at least in a partial region. The adhesion-reducing treatment can be carried out before or after embossing. The manner of application of the transfer layer is also significant for the adhesive force.

As coating materials there come into consideration basically all opaque materials whose lateral cohesion is not too great. With tough materials it is often difficult to obtain the desired sharp-edged break of the transfer layer. The manner of application of the coating materials can also play a role here. A sharper-edged transfer is quite generally possible with very thin layers than with thicker layers of the same material. Suitable layer thicknesses lie in the range of about 30 to 500 nm, preferably up to about 200 nm. Especially well suited are metals, metal alloys, mixtures of metals that do not form an alloy, layers of metals one over the other, metals that are present as a cluster after application, i.e. basically all conceivable combinations of mutually compatible metals. The metallic coatings are preferably vapor-deposited, in particular by physical vapor deposition (PVD). Particularly preferred metals are aluminum, copper, tin, zinc, silver and gold. Multicolored coatings can also be obtained by corresponding combinations. The best results were hitherto obtained for aluminum with a line width of $2\ \mu m$ and a layer thickness of the Al layer of about 50 nm.

Other coating materials are for example metallic effect inks, thermochromic layers, layers with color pigments, fluorescent pigments, or other effect pigments, liquid-crystal layers, and other coatings with a color-shift effect such as layers of thin-film elements, and high-refractive layers, for example of ZnS. Suitable layer thicknesses for the hereinabove coating materials lie in the range of a few micrometers. Layer combinations are also possible. Colors are usually imprinted, but it is also possible to produce colored layers by sublimation dyes. Some of these layers cannot be applied to the embossed foil or the embossing lacquer layer directly, but require the application of an intermediate layer. An intermediate layer is advantageous for example with liquid-crystal layers in order to ensure a suitable orientation of the liquid crystals. Metallizations with a color-shift effect typically have a ceramic intermediate layer (for example $SiO_2$), which should preferably be thin, because otherwise a sharp-edged break of the dielectric is not always guaranteed. Colored layers without a color-shift effect can be obtained by means of thin dielectrics or high-refractive dielectrics, the small thickness making it possible to avoid a non-sharp-edged break. A layer thickness of the dielectric of 300 nm should normally not be exceeded, the layer thickness of the dielectric also depending on the embossing depth and the manner and quality of the vapor deposition or coating, so that thicker layers are also possible from case to case.

Apart from the donor foil, an acceptor foil is prepared. The acceptor foil likewise has a carrier foil, the same foil materials basically being suitable as for the donor foil. As with the donor foil, the foil material thicknesses are preferably between about $3\ \mu m$ and about $50\ \mu m$, in particular about $5\ \mu m$ to about $25\ \mu m$. Particularly preferable are transparent or at least translucent foil materials.

This foil material is coated on one surface with an adhesive. The adhesive layer can be applied either over the full area or as a motif. An adhesive is understood here to be a material that is sticky under the later transfer conditions or can be made adequately sticky for transfer. Suitable adhesives are for example ones based on vinyl chloride copolymers and arbitrary heat seal lacquers (thermoplastics), which, under elevated pressure and elevated temperature, develop an adhesion to the coating to be transferred. It is advantageous when the adhesive layer is block-free at ambient temperature, in order that the foil materials can be held on stock in wound or stacked form. Alternatively, the adhesive is only applied directly when required. When the coating with adhesive is effected in time proximity to the intended transfer, the adhesive coating can also be constructed so as to cross-link, so that the bonding of donor foil and acceptor foil can be carried out at a relatively low temperature, while after a certain waiting time, i.e. upon the later separation of donor foil and acceptor foil, the adhesive is cross-linked to the extent that it is able to detach the regions, to be transferred, of the transfer layer from the donor foil in sharp-edged fashion, on the one hand, and no longer tends to block in the non-bonded regions, on the other hand. An elegant solution is dual-cure systems. These coating systems are imprinted after being diluted with solvents or with water, and are subsequently dried, i.e. solvents and/or water are removed, typically simply by evaporation. Upon bonding to the donor foil, the adhesive system is still adhesive, at least under elevated temperature, but, after bonding, the adhesive coating is cross-linked, through a post-exposure, or in general post-irradiation, to the extent that the non-bonded regions of the coating no longer tend to block. Whether a tendency to block (tack) is still present can be verified by the following test: coated foil pieces of about 100 $cm^2$ are stacked and loaded with a weight of 10 kg and stored for 72 hours at 40° C. If the foil pieces can thereafter be easily separated from each other without damaging the coatings, the coating is to be considered tack-free.

The adhesives can contain usual additives, for example plasticizers for adapting the softening point, or wetting agents, defoamers, waxes, etc. They can also serve as a carrier for feature substances, for example for fluorescent substances, thermochromic or other dyes, magnetic pigments, and other accessory agents.

Especially suitable adhesives that can be employed in the present invention are described in DE 10 2004 035 979, whose disclosure is incorporated into the present application to this extent. These are adhesives, in particular dispersion adhesives, which contain at least one radiation-cross-linkable component and are cross-linked by short-wave radiation, such as ultraviolet radiation or short-wave visible radiation, or by electron radiation, preferably by UV radiation.

Further suitable adhesives are the resist lacquers stated in DE 10 2008 036 480. Exemplary compositions are stated therein and become the subject matter of the present application to this extent. The resist properties of these adhesives are not utilized in the present invention, however.

The thickness of the adhesive layer is to be coordinated with the thickness of the coating to be transferred. On condition that the adhesive layer does not give way too much upon lamination, it can in principle also be thicker than the coating to be transferred. In any case the adhesive layer must not reach the transfer layer in the depressions of the embossed structure under lamination conditions.

Application of the adhesive layer can be done by arbitrary known methods. Preferably, the adhesive layer is imprinted. Besides a full-area application, a partial-area application is also possible, for example as a motif. In this way it can be defined at which places the donor foil is to bond to the acceptor foil, i.e. at which places a coating transfer is to take place.

As the next step, the donor foil and the acceptor foil are laminated, i.e. the two foils are bonded together by means of the adhesive layer. For this purpose, the two foils are so brought together or placed one on the other that the coating to be transferred from the donor foil and the adhesive layer of the acceptor foil face each other, and then pressed together, preferably under elevated temperature. In so doing, the embossed structure of the donor foil can be embossed into the adhesive layer of the acceptor foil, where applicable. Suitable bonding conditions are typically about 60° C. to 160° C. and a line pressure of typically 0.1 N/mm to 15 N/mm. The exact conditions are of course dependent on the kind of adhesive employed. With cross-linking systems, irradiation must be effected, where applicable, or at least the bonded composite left to rest for a certain time to make cross-linking possible. Upon the separation of donor foil and acceptor foil from each other it must be guaranteed that the adhesive connection between coating and adhesive layer is so firm that it cannot be undone under the separation conditions. At the same time, the non-bonded region of the adhesive layer should preferably be tack-free. With common heat seal lacquers, it is usually sufficient to wait for the lacquer to cool. Then the donor foil and the acceptor foil can be separated from each other.

The separation is preferably carried out by a separation winding. Upon separation of the donor foil and the acceptor foil from each other, the coating of the donor foil tears exactly on the contour lines of the bonding areas of coating and adhesive layer. Because the coating adheres to the adhesive layer substantially better than to the donor foil, the regions of the coating (transfer-layer areal elements) located on elevations of the embossed structure of the donor foil remain adhering to the adhesive layer, while all other regions of the coating still adhere to the donor foil. Hence, the coating areal regions transferred to the acceptor foil reproduce exactly the arrangement and shape of the elevations of the embossed structure of the donor foil. Upon the transfer process there thus arises from the acceptor foil a carrier with a microstructure having the transferred coating areal elements, while from the donor foil there arises a carrier with a microstructure lacking precisely these areal elements. The microstructures of the two carriers are thus complementary in this respect. Finally, the microstructure carriers are preferably equipped with a protective coating.

The method according to the invention is also excellently suited for producing multicolored microstructures of materials of which it is impossible, or very complicated, to produce multicolored microstructures otherwise. Examples thereof are microstructures of various metals. The possibilities for producing multicolored microstructures will be explained hereinafter with reference to FIGS. 5 and 6.

The embossed structure of the donor foil typically has a primary structure and a secondary structure. The primary structure is predefined by the embossed areas. For example, it can be predefined by the embossable coating being applied in the form of a certain motif, thereby causing only the areas provided with the coating to be embossable. An alternative kind of coarse structuring consists in configuring the transfer coating in multicolored fashion or providing it only in certain areal regions, for example in the form of a motif. The line width of the coarse structuring typically amounts to more than 50 μm with an insetting tolerance of about 300 μm. The secondary structure is predefined by the shape of the elevations and depressions of the embossed motif. In this fine structuring, the line width lies in the order of magnitude of about 2 μm. A further kind of primary structuring results when an adhesion-reducing layer modulated in certain regions is used. In regions with reduced adhesion (i.e. with an adhesion-reducing or non-stick layer) the transfer coating is transferred, while in regions where the adhesion-reducing layer is absent or deactivated there is no transfer of the transfer coating. Alternatively (the primary structure of the donor foil being absent) or additionally, the primary structure can also be predefined by the adhesive layer of the acceptor foil.

The primary structure and the secondary structure can be additionally combined with a tertiary structure. Such a tertiary structure may be for example a diffractive structure or a refractive structure such as an embossed hologram structure. The typical embossed hologram structure is substantially flatter than the secondary structure. The tertiary structure can be present either over the full area or only on the elevations or only in the depressions of the secondary structure. The tertiary structure is accordingly also formed in the transfer coating and, upon transfer of the transfer coating, embossed into the adhesive layer of the acceptor foil and simultaneously transferred along with the transferred regions of the coating.

When the tertiary structure is for example a hologram that is embossed into the elevations of the embossed structure of the donor foil, this holographic information is transferred into the adhesive layer of the acceptor foil upon the transfer process. When the holographic information is embossed into the depressions of the embossed structure of the donor foil, it remains on the donor foil in these regions together with the transfer layer upon the transfer process.

According to a variant, the tertiary structure can constitute for example a nanostructuring which is embossed into the embossing lacquer of the donor foil as a suitable additional structure. With this form of nanostructuring, additional colorfulness can be produced by exploiting plasmons or resonance phenomena, or a blackening by using moth-eye structures. When the nanostructures have been embossed into the elevations of the embossed structure of the donor foil, it must be heeded upon transfer to the acceptor foil that the nanostructuring is transferred into the adhesive. When the embossed nanostructures are located in the depressions of the embossed structure, however, this is not required.

Another variant of a tertiary structure is a nanostructuring through a suitable coating. With this form of nanostructuring as well, additional colorfulness can be produced by exploiting plasmons or resonance phenomena, or a blackening by using moth-eye structures. These effects are obtained here for example with coatings of colors based on a lacquer carrier with metallic nanoparticles. The effect of the coloration is probably based on incident electromagnetic radiation exciting volume plasmons or surface plasmons in the nanoparticles and/or causing resonance phenomena. Advantageously, the metallic nanoparticles have a dimension between 2 nm and 400 nm, preferably between 5 nm and 300 nm. The metallic nanoparticles can be configured substantially spherically, but can also be configured with a preferential direction, in particular as spheroids or in rod or platelet form. With regard to suitable materials, reference is made to the disclosure of the application WO 2009/083151, which is incorporated into the present description to this extent. These nanostructuring coatings can themselves form the transfer coating or be provided in addition to a transfer coating. They are likewise applied over the full area (in any case in the motif regions of the donor foil in which regions a transfer is to take place), and transferred from the elevations of the embossed structure of the donor foil into the adhesive layer of the acceptor foil. All other nanostructured regions of the donor foil, i.e. the regions not located on elevations, remain behind on the donor foil. The equipping with a tertiary structure will be described more closely hereinafter with reference to FIGS. 8, 9 and 10.

The microstructure carriers obtained from the acceptor foil and from the donor foil after the transfer process can be employed as security features, namely, each alone or in combination with a micro-optic viewing device. When such a microstructure carrier forms a security feature of a security element taken alone, it is equipped in the known way with protective layers, adhesive layers and, where applicable, further functional layers, in order to manufacture the security element, for example a security thread. A microstructure carrier which can be used advantageously without a micro-optic viewing device will be explained hereinafter in connection with FIG. 10.

Usually, the microstructure carriers obtained by the method according to the invention are combined with one or with two micromotif viewing devices into a micro-optic representation arrangement. The microstructure carrier then forms the micromotif layer of the micro-optic representation arrangement. Micro-optic representation arrangements are in particular micro-optic magnification arrangements such as moiré magnification arrangements, magnification arrangements of the moiré type and modulo magnification arrangements, as described in the prints DE 10 2005 062 132, WO 2007/076952, DE 10 2007 029 203, WO 2009/000529, WO 2009/000527 and WO 2009/000528, whose disclosure in this connection is hereby incorporated by reference. All these micro-optic magnification arrangements contain a motif picture with microstructures which reconstructs a predefined desired picture upon viewing with a suitably coordinated viewing grid. As explained more precisely in the above-mentioned prints, there can thereby be produced a multiplicity of visually attractive magnification and movement effects which lead to a high recognition value and a high forgery resistance of the security elements equipped therewith. As viewing devices there serve microlens arrangements, but other microfocusing element arrangements can also be employed. The microstructure carriers according to the invention can in general provide the micromotifs, which are to be viewed, in arbitrary micro-optic representation arrangements. Examples of micro-optic representation arrangements with a microstructure carrier according to the invention will be shown hereinafter in FIGS. 11 to 13, 15, 18, 21 to 23 and 26 to 29. As to be seen in these figures, the microstructure carrier according to the invention can be equipped with microfocusing elements (microlenses in the figures) on one side or on both sides. Moreover, the microstructure carrier can either be a separate component of the representation arrangement, i.e. possess its own carrier material, or it can be integrated into the microfocusing device, i.e. the carrier material of the microfocusing device can simultaneously be the carrier material of the microstructure.

In an advantageous development of the invention, the microstructure forms a motif picture which is divided into a plurality of cells in which respectively imaged regions of a predefined desired picture are arranged. The lateral dimensions of the imaged regions preferably lie between about 5 µm and about 50 µm, in particular between about 10 µm and about 35 µm. With the micro-optic moiré magnification arrangements first mentioned above, the imaged regions of the cells of the motif picture respectively represent reduced images of the predefined desired picture which are completely accommodated within a cell. With the micro-optic magnification arrangements of the moiré type, the imaged regions of several spaced cells of the motif picture taken together respectively represent a reduced and, where applicable, linearly imaged image of the desired picture, whose extension is greater than a cell of the motif picture. In the most general case, the magnification arrangement represents a modulo magnification arrangement wherein the imaged regions of the cells of the motif picture represent non-complete details of the predefined desired picture that are respectively imaged by a modulo operation.

According to another variant of the present invention, the microstructure carriers can also be so designed that they can be used instead of microfocusing arrangements as alternative viewing arrangements in micro-optic representation arrangements. Examples of alternative viewing elements are hole masks and slot masks or inverse hole and slot masks, which can be manufactured very simply by equipping a donor foil material with an embossing of suitable dimensions and coating it with a non-transparent coating. After transfer of the non-transparent coating from the elevations of the donor foil to an acceptor foil, the acceptor foil has non-transparent places in the regions of the elevations and transparent places in the regions of the depressions, whereby each transparent place (hole masks, slot masks) or each non-transparent place (inverse hole masks, inverse slot masks) can represent a micromotif viewing element. Accordingly, the donor foil has transparent places in the regions of the elevations and non-transparent, coated places in the regions of the depressions, whereby here, too, each transparent place or each non-transparent place can serve as a micromotif viewing element. An advantage of such micromotif viewing elements is that no defined focal distance from the micromotif to be viewed is required, as with lens arrangements.

In particular for forming hole masks and slot masks for employment in micro-optic representation arrangements, the dimensions of the transparent places should be rather small in comparison to the dimensions of the non-transparent places. Advantageously, the dimensions of the transparent places lie between 1 µm and 5 µm, particularly preferably between 1 µm and 3 µm. To moreover avoid acceptor foil and donor foil touching each other in the regions of the depressions upon lamination and leading to an unwanted additional transfer of the coating, the embossed structure is preferably designed here such that the elevation areal elements have a considerably greater surface area than the depression areal elements. Accordingly, the micromotif viewing elements of hole masks or slot masks are preferably formed by the transparent places of the acceptor foil.

Because the micromotif component as well as the micromotif viewing component of a micro-optic representation arrangement are manufacturable by the method according to the invention, micro-optic representation arrangements can have a micromotif component manufactured according to the invention, or a micromotif viewing component manufactured according to the invention, or both.

It should be stressed, however, that the invention is not limited to these applications. Rather, the described method can advantageously also be utilized in the manufacture of other security elements, for example in producing microtext prints on paper or foil.

Security elements having a microstructure carrier according to the invention can have further functional layers, i.e. layers having some properties or other that can be detected visually or by machine. Functional layers hence contain for example dyes, luminescent substances, thermochromic substances, liquid crystals, interference pigments, electrically conductive substances, magnetic substances, light-diffractive or light-refractive structures or combinations thereof. Moreover, suitable layers for attachment to an object to be protected are to be provided, such as an adhesive layer.

The security elements according to the invention can be employed for securing the authenticity of goods of any kind. They are preferably used for securing the authenticity of value documents, for example in bank notes, checks or identification cards. They can be arranged here on a surface of the value document or be embedded wholly or partly into the value document. Especially advantageously, they are utilized for covering the hole in value documents having a hole. In such a case, the security element can be viewed from both sides, with identical or different motifs becoming recognizable in the security elements according to the invention, depending on the embodiment. Negative scripts with fine structures which are easily manufacturable by means of the microstructure carriers according to the invention can also be clearly recognized in transmitted light. Such security elements are practically impossible for a forger to imitate.

The microstructure carriers or security elements according to the invention can be manufactured individually, but are usually manufactured in the form of sheets or bands with a multiplicity of single copies. The security elements can also be provided in the form of transfer materials, that is, sheets or bands with a multiplicity of finished security elements prepared for transfer. With a transfer material, the layer construction of the later security element is prepared on a carrier material in the reverse order in which the layer construction is to be present later on an object of value to be authenticated, as is known to a person skilled in the art.

DESCRIPTION OF THE DRAWINGS

The invention will hereinafter be illustrated further with reference to figures. It is pointed out that the figures are not true to scale and not true to proportion. Further, the features represented in a figure are not only applicable in combination with the other features represented in the corresponding figure. Rather, features described in connection with a special embodiment can be used quite generally in the method, or microstructure carrier, or security element, according to the invention. Moreover, there are respectively only represented the features or layers essential for understanding the described method or described effects. It is evident that additional features or layers can be present. Identical reference numbers designate identical or corresponding elements. There are shown:

FIG. 1 a schematic representation of a bank note having security elements in the form of an embedded security thread and bonded transfer elements, FIG. 2 a schematic representation of the layer construction of an embodiment of a security element according to the invention, FIG. 3 a method sequence of the method according to the invention for producing a microstructure carrier, represented by sections through donor foil and acceptor foil in different method stages, FIG. 4 an alternative method sequence of the method according to the invention for producing a microstructure carrier, likewise represented by sections through donor foil and acceptor foil in different method stages, FIG. 5 a method sequence of the method according to the invention wherein a microstructure carrier with a multicolored motif and negative script is manufactured, FIG. 6 an alternative method sequence of the method according to the invention wherein a microstructure carrier with a multicolored motif and negative script is manufactured, FIG. 7 method steps of the method according to the invention, respectively represented by plan views of, and sections through, donor foil and acceptor foil, FIGS. 8 to 10 sections through different embodiments of microstructure carriers according to the invention having tertiary structures, FIGS. 11 to 13 sections through embodiments of micro-optic representation arrangements of security elements according to the invention, FIG. 14 a section through a donor foil upon the manufacture of a microstructure carrier for employment as a micromotif viewing device, FIG. 15 a section through a further embodiment of a micro-optic representation arrangement of a security element according to the invention, FIG. 16 a method sequence of the method according to the invention for producing a microstructure carrier, represented by sections through donor foil and acceptor foil in different method stages, wherein several congruent or complementary microstructures are produced, FIG. 17*a* an enlarged plan view of a security element of FIG. 1, FIG. 17b a plan view of an alternative security element according to the invention, FIG. 18 a sectional view of the security element of FIG. 17a, FIGS. 19 and 20 schematic views for explaining the manner of functioning of the micro-optic representation arrangements of the security element of FIG. 17a, FIGS. 21 to 23 sectional views of further embodiments of security elements according to the invention, FIG. 24 a plan view of a micro-optic representation arrangement employable in security elements according to the invention, FIG. 25 a section along the line 39 of FIG. 25, FIGS. 26 and 27 method variants for manufacturing micro-optic combination representation arrangements according to the invention having a first and a second micro-optic representation arrangement, and FIGS. 28 and 29 sections through alternative embodiments of optical representation arrangements according to the invention.

DETAILED DESCRIPTION OF EXEMPLARY EMBODIMENTS OF THE INVENTION

Figure 12:
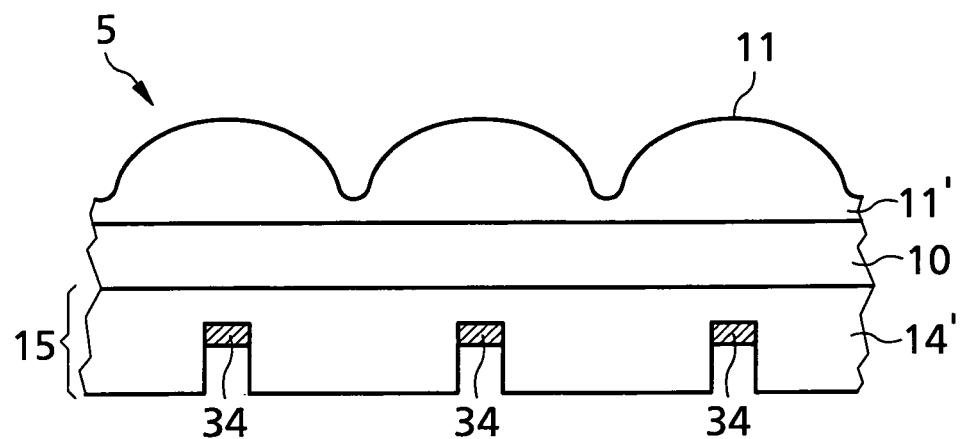

The invention will now be explained with reference to nonrestrictive examples. FIG. 1 shows a schematic representation of a bank note 1 which is provided with three security elements 2, 3 and 6 according to the present invention. The security element 2 is a security thread which emerges on the surface of the bank note 1 in certain window regions 4, while being embedded in the interior of the bank note in the interjacent regions. The security elements 3 and 6 are bonded transfer elements of arbitrary form. They may alternatively also be security elements in the form of cover foils which are arranged in or over a window region or a through opening of the bank note.

The security thread 2 as well as the transfer elements 3 and 6 can contain a micro-optic representation arrangement according to an embodiment example of the invention. As explained more closely above, such a micro-optic representation arrangement can be configured in particular as a moiré magnification arrangement, as a micro-optic magnification arrangement of the moiré type or as a modulo magnification arrangement. The manner of functioning and the manufacturing method according to the invention for such arrangements will be described more closely hereinafter with reference to the security element 5 having a moiré magnification arrangement. The security element 6 is a combination security element. Combination security elements will be described in connection with FIGS. 17 to 27.

FIG. 2 shows schematically the layer construction of an embodiment of the security element 5, for example of the security thread 2 or of the transfer element 3 of FIG. 1. Represented here as well as in all other figures are only the parts of the layer construction that are required for explaining the functional principle. The security element 5 possesses a carrier material 10 in the form of a transparent plastic foil, for example of a polyethylene terephthalate (PET) foil about 20 μm thick. The upper side of the carrier 10 is provided with a grid-shaped arrangement of microlenses 11 which form on the surface of the carrier a two-dimensional Bravais lattice having a preselected symmetry. The Bravais lattice can have for example a hexagonal lattice symmetry, but a lower symmetry and thus a more general form, in particular the symmetry of a parallelogram lattice, is preferred because of the higher forgery resistance.

The spacing of neighboring microlenses 11 is preferably as small as possible to guarantee as high an area coverage as possible and thus a contrast-rich representation. The spherically or aspherically configured microlenses 11 preferably have a diameter between 5 μm and 50 μm, and in particular a diameter between only 10 μm and 35 μm, and are hence not recognizable with the naked eye.

On the underside of the transparent carrier 10 there is located a motif layer 15 which contains a likewise grid-shaped arrangement of identical micromotif elements 14. The arrangement of the micromotif elements 14 also forms a two-dimensional Bravais lattice having a preselected symmetry, for example having a hexagonal lattice symmetry or the symmetry of a parallelogram lattice. The micromotif layer 15 is formed by a microstructure carrier according to the invention, the micromotif elements 14 either having arisen from depressions of the embossed structure of the donor foil, or corresponding to elevation areal elements of the coating of the donor foil that have been transferred to the acceptor foil. For fastening the security element to a value document, an adhesive layer 16 is provided.

As indicated in FIG. 2 by the offset of the micromotif elements 14 relative to the microlenses 11, the Bravais lattice of the micromotif elements 14 slightly differs in its orientation and/or in the size of its lattice parameters from the Bravais lattice of the microlenses 11 in order to produce the desired moiré magnification effect. The lattice period and the diameter of the micromotif elements 14 lie here in the same order of magnitude as that of the microlenses 11, i.e. in the range of 1 μm to 50 μm, in particular in the range of 10 μm to 35 μm, so that the micromotif elements 14 are also unrecognizable with the naked eye.

The optical thickness of the carrier 10 and the focal length of the microlenses 11 are so mutually coordinated that the motif layer 15 and thus the micromotif elements 14 are located approximately at the distance of the lens focal length (indicated by the dashed lines). The carrier 10 thus forms an optical spacer layer which guarantees a desired constant spacing of the microlenses 11 and the micromotif elements 14. Due to the slightly differing lattice parameters, the viewer viewing from above through the microlenses 11 respectively sees a somewhat different partial region of the micromotif elements 14, so that the multiplicity of the microlenses 11 produces altogether a magnified picture of the micromotif elements 14. The resulting moiré magnification depends here on the relative difference of the lattice parameters of the employed Bravais lattices. If, for example, the lattice periods of two hexagonal lattices differ by 1% there results a 100-fold moiré magnification. For a more detailed description of the manner of functioning and for advantageous arrangements of the motif grids and of the microlens grids, reference is again made to the prints DE 10 2005 062 132 and WO 2007/076952, whose disclosure is incorporated into the present application to this extent.

The above expositions should not be understood to mean, however, that the present invention is limited in any way to moiré magnification arrangements. The invention is instead applicable quite generally to micro-optic representation arrangements, and especially advantageously in particular also to modulo mapping magnification arrangements, as are described in the applications WO 2009/00528 and WO 2009/00527.

FIG. 3 illustrates the method sequence of the method according to the invention. The starting point is a transparent donor foil 20 (FIG. 3a) which is coated on one of its principal areas 22 with a transparent embossable layer 23. Into the embossable layer 23 there is embossed an embossed structure having elevations and depressions, the structure depth preferably lying in the range between about 0.5 µm and about 10 µm, and the line width preferably lying in the range between about 1 µm and about 10 µm. The surface of the embossed structure is thus composed of elevation surfaces 25, depression surfaces 26 and surfaces on the flanks 27 of the elevations.

It should be pointed out that in this and all subsequent figures the embossed structure is always represented as a rectangular structure because of the simpler representation. In actuality, embossed structures with sharp edges are preferred, because the separation of the elevation areal elements and depression areal elements can be effected in more defined fashion here. Depending on the coating material used, it can in practice also suffice for achieving the desired sharp-edged break of the coating to employ rounded embossed structures with continuous transitions between elevations and depressions.

There is to be manufactured a microstructure carrier with a micromotif of metallic micromotif elements, the motif requiring that certain regions of the micromotif carrier remain free from a metallization. With coatings that can be imprinted in the form of a certain motif, such a requirement poses no problem, but metallizations can in most cases only be produced over the full area, because they are usually vapor-deposited, and a vapor deposition in motif form is hitherto impossible. The metallization-free areal regions must hence be produced in a different way. In the method variant represented in FIG. 3, there is used a so-called "washing method" as is known for producing so-called "negative scripts". A negative script is a gap of arbitrary form, i.e. any non-all-overness, in a non-transparent coating. In the case of the present invention, wherein the micromotif elements necessarily do not constitute a full-area coating, a negative script is understood to be the lack of micromotif elements in an otherwise regular arrangement of micromotif elements. In such a washing method, a soluble washing ink is preferably before metallization imprinted on the embossed structure in the form of the desired demetallization region, and after metallization the washing ink washed off together therewith by a solvent. Further details on such a washing method can be found in the print WO 99/13157, whose disclosure is incorporated into the present application to this extent.

Before the application of the transfer coating it is preferable to perform an adhesion-reducing treatment of the surface to be coated. For this purpose, the embossed structure is for example coated with washing ink over the full area, and the washing ink washed off again. Applying and washing off washing ink has quite generally proved itself as an adhesion-reducing treatment.

As represented in FIG. 3b, the surface of the embossed structure is then coated with a washing ink 35 in those regions that are to remain free from micromotif elements. Thereafter a metal is vapor-deposited on the embossed structure over the full area, thereby giving rise to the coating 30 which covers the washing ink 35 as well as the elevation surfaces 25 and the depression surfaces 26 of the embossed structure. It is not represented in FIG. 3b that the metallic coating also covers the flanks 27 of the elevations of the embossed structure to a greater or lesser extent. How thick the coating on the flanks actually is depends on several factors, inter alia, on how strongly rounded the embossed structure is and on the angle at which the metal is vapor-deposited. In any case the coating is always present as a substantially continuous layer that is composed of elevation areal elements 33 on the elevation surfaces 25, depression areal elements 34 on the depression surfaces 26, and areal elements on the flanks 27, as well as, in this embodiment example, areal elements over the washing ink 35. The thickness of the coating 30 preferably lies in the order of magnitude of about 50 nm. "Areal elements" have a certain thickness, unlike surfaces.

FIG. 3c shows the state after washing off the washing ink 35 and the metallization 30 located thereover. The region previously coated with washing ink is now free from a metallization, while the metallization is present unchanged in the other regions. This donor foil 20 is now brought in contact with an acceptor foil 50. The acceptor foil 50 is represented in FIG. 3d. It consists of a transparent foil material 51 which is coated on one of its principal areas 52 over the full area with a transparent adhesive layer 53. The acceptor foil 50 (FIG. 3d) and the donor foil 20 (FIG. 3c) are pressed together, preferably under elevated pressure and elevated temperature. In the laminating process the embossed structure of the donor foil 20 can optionally be transferred into the adhesive layer 53 of the acceptor foil 50. The exact lamination conditions depend on the kind of adhesive employed. Where applicable, an irradiation of the composite of donor foil 20 and acceptor foil 50 can be required, or at least a certain waiting time, to obtain a cross-linking and cure of the adhesive. When the adhesive has cooled and/or sufficiently cured, the two foils are separated from each other, preferably by separation winding. There thus arises from the donor foil 20 the microstructure carrier 46 (FIG. 3e), and from the acceptor foil 50 there arises the microstructure carrier 45 (FIG. 3O. As can be seen in FIG. 3f, the microstructure carrier 45 only has transfer-layer elevation areal elements 33 in a partial region of its surface. The region having transfer-layer elevation areal elements 33 corresponds to the donor-foil region 28 that was metallized over the full area. From the donor-foil region 29 from which the transfer layer had previously been removed by means of washing ink, no transfer-layer elevation areal elements could of course be transferred into the full-area adhesive layer 53 of the acceptor foil. The transfer-layer elevation areal elements 33 form the micromotif of the microstructure carrier 45. The primary structure of the micromotif is determined by the arrangement of the areal elements 33, while the fine structure (secondary structure) is determined by the embossed motif. In the embodiment shown in FIG. 3f, the motif is finally coated with a protective layer 65. It is basically expedient to protect the motif in some way, but this function can also be performed by any other layers with which the microstructure carrier is to be combined for other reasons.

FIG. 4 shows an alternative method sequence of the method according to the invention for producing a microstructure carrier. This method variant is applied in particular when the micromotif to be manufactured has regions that are free from micromotif elements (for example a negative script), but there is no practicable method for pre-forming this coarse structure (primary structure) in the donor foil. This holds in particular for various metallic transfer layers. In such a case a donor foil 20 consisting for example of a first foil material 21 and a full-area embossed layer 23, as represented in FIG. 4a, is coated over the full area with a transfer layer. The transfer layer again consists of depression areal elements 34, elevation areal elements 33 and, not represented in FIG. 4a, areal elements on the flank regions of the elevations of the embossed layer. This donor foil 20 is laminated onto an acceptor foil 50 which is equipped only in partial regions with an adhesive layer 53. Such an acceptor foil 50 is represented in FIG. 4b. Here, the carrier foil material 51 is free from an adhesive layer 53 in the region 60. The region 60 is the region in which the microstructure carrier 45 to be manufactured from the acceptor foil 50 is to have no micromotif elements. The donor foil 20 and the acceptor foil 50 are, as described above, interconnected under elevated pressure and elevated temperature, and then separated from each other again.

The state after separation is represented in FIG. 4c and FIG. 4d. In the region where the acceptor foil 50 was coated with adhesive, the transfer layer was embossed and transferred from the elevations of the embossed structure of the donor foil into the adhesive layer of the acceptor foil. The microstructure carrier 45 (FIG. 4d) accordingly has a motif that is formed by the transferred transfer-layer elevation areal elements 33. The microstructure carrier 46 formed from the donor foil 20 (FIG. 4c) accordingly has the complementary microstructure, the microstructure being in this case a full-area metallization with an arrangement of "holes" in the metallization. The holes are respectively located at the places of the elevation surfaces 25 from which the transfer-layer elevation areal elements 33 were transferred to the acceptor foil 50.

In FIG. 5 there is represented a method sequence of the method according to the invention that is analogous to the method sequence represented in FIG. 3. In contrast to FIG. 3, however, there is now to be manufactured a three-colored motif The starting point is again a donor foil 20 with a carrier foil 21 having an embossed layer 23 embossed over the full area. The embossed structure has elevation surfaces 25 and depression surfaces 26 (FIG. 5a). The surface of the embossed layer 23, after an adhesion-reducing pretreatment, where applicable, is coated with a first washing ink 35 in a partial region, as represented in FIG. 5b. A region 30' remains free from washing ink. Subsequently, a first metallization 30 is vapor-deposited over the full area. The metallization 30 is located only in the region 30' directly on the surface of the embossed layer 23, but in all other regions on the washing ink 35. In these regions the metallization 30 can now be washed away in the known way, so that the state represented in FIG. 5c is obtained. In FIG. 5b and the following figures the coating 30 is also represented on the flanks 27 of the elevations of the embossed structure, in contrast to FIG. 3 and FIG. 4.

The steps of applying a washing ink over part of the area, subsequent metallizing, as well as removing the metallization in the regions over the washing ink are now repeated as often as required to produce the desired multicoloredness of the motif to be manufactured. In the present case a three-colored motif is to be manufactured. It is thus necessary altogether three times to coat with washing ink over part of the area, apply a metallization over the full area, and remove the metallization again in the regions located over the washing ink. First (FIG. 5d) a washing ink 36, which can be identical with the previous washing ink 35 or not, is applied to the surface of the embossed layer 23 over part of the area, thereby partly also covering the metallization 30. A partial region 31' of the surface remains free. Subsequently, a second metallization 31 is vapor-deposited, thereby yielding the state shown in FIG. 5d. After washing off the washing ink 36 and the regions of the metallization 31 located over the washing ink, there is obtained the foil shown in FIG. 5e, which is coated with a first metallization 30 in a partial region, and is coated with a second metallization 31 in another partial region.

Now, as shown in FIG. 5f, there is applied a third washing ink 37, which can be identical with the washing inks 35, 36 or not. A partial region 32' of the surface of the embossed layer 23 remains free from the washing ink 37. Subsequently, a third metallization 32 is applied, and then removed again together with the washing ink in the region located over the washing ink 37. This results in the donor foil, represented in FIG. 5g, having a transfer layer constructed from three different metals, typically of different color. In the region 38 the transfer layer has a gap. In this region the carrier foil 21 was always covered by a washing ink upon the preceding metallizations, so that the metallization was repeatedly washed off together with the washing ink.

Using this donor foil, a multicolored micromotif layer is now to be produced in an acceptor foil. A suitable acceptor foil 50 has a carrier foil 51 which is coated with an adhesive layer 53 over the full area on a principal area 52 (FIG. 5h). For better recognizability of the transfer process now following, the donor foil 20 is represented again directly under the acceptor foil 50. As to be seen in FIG. 5i, the donor foil 20 possesses regions 28 with transfer layer and a region 29 without transfer layer. After the laminating of the donor foil 20 and the acceptor foil 50 and the subsequent separation of the foils for transferring the transfer layer, there is obtained from the acceptor foil 50 the micromotif carrier 45 shown in FIG. 5j, and from the donor foil 20 the micromotif carrier 46 shown in FIG. 5k. The micromotif carrier 45 again has a motif which is formed by the transferred transfer-layer elevation areal elements. The micromotif carrier 45 represented here has the peculiarity that it shows different views depending on the side it is viewed from. From the viewing direction designated with the arrow in FIG. 5j the viewer sees a merely two-colored motif (micromotif elements 30, 32), but from the opposite viewing direction a three-colored motif (micromotif elements 30, 31, 32). This is due to the fact that a portion of the micromotif elements (the three right-hand micromotif elements in FIG. 5j) is "two-ply", because a two-fold metallization was performed here.

The microstructure carrier 46 formed from the donor foil 20 has the microstructure complementary to the micromotif carrier 45, i.e. the elevation surfaces 25 are now all free from transfer layer, while the transfer-layer depression areal elements 34 as well as the transfer-layer areal elements on the flanks of the elevations are present unchanged. The "negative script" of the non-metallized region 29 is of course present in both microstructure carriers 45, 46. It should be pointed out that the transfer layer on the flanks of the elevations that remains on the microstructure carrier 46 is in actuality substantially thinner than represented in FIG. 5k.

FIG. 6 illustrates a method sequence as in FIG. 4, the difference being that a three-colored micromotif is to be produced, as in FIG. 5. As represented in FIG. 6a, a carrier foil 21 is again provided with an embossed layer 23 with a full-area embossing, the embossing having elevation surfaces 25, depression surfaces 26 and flanks 27 of the elevations. This embossed structure is coated over the full area with a transfer layer of a first metal 30, the coating consisting of elevation areal elements 33, depression areal elements 34 and areal elements on the flanks 27 of the elevations. A further foil material 51 is coated on one of its principal areas 52 with an adhesive layer 53. However, the coating is only effected over part of the area, as represented in FIG. 6b, so that there are regions 56 with adhesive and regions 60 without adhesive. The donor foil from FIG. 6a and the acceptor foil from FIG. 6b are then bonded into a foil composite, whereby the bonding can take place only in the region 56 of the acceptor foil 50. In this region the elevation areal elements 33 of the transfer layer 30 are embossed into the adhesive 53 and bonded thereto. In FIG. 6 the transferred areal elements of the transfer layer are respectively represented on a surface of the adhesive layer. In actuality, they can be embossed into the adhesive layer to a greater or lesser extent, depending on the pressure upon lamination. FIG. 6c shows the state of the acceptor foil 50 after the separation winding.

In further coating and lamination steps, micromotif elements of further metals are now applied. In so doing, the problem arises that after the separation winding the adhesive layer 53, in all regions where it is not bonded to the metal 30, is still potentially sticky, at least under lamination conditions, i.e. under elevated pressure and, where applicable, elevated temperature. Hence, transfer-layer material could be transferred to this adhesive layer uncontrolledly upon a further transfer step. In all method variants involving a repeated transfer of transfer-layer areal elements to an acceptor foil, measures are hence preferably taken to deactivate the respective preceding adhesive layer. For this purpose, substantially two measures are available, namely, a change of the adhesive layer itself, on the one hand, and a covering of the adhesive layer, on the other hand. A change of the adhesive layer itself in such a way that it remains fully inactive upon further transfer steps is a preferred procedure in the case of adhesive layers that can be adequately deactivated by cross-linking. The deactivation by cross-linking is preferably effected before the applying of further adhesive layers. Alternatively, the adhesive layer can be prevented by a non-adhesive cover layer from participating in further transfers. When choosing such cover layers one must make sure they do not too strongly dissolve the layers on which they are applied.

In FIG. 6 there is represented the method variant with cover layers. FIG. 6d shows the acceptor foil 50 after the first transfer step (FIG. 6c), and already prepared for the next transfer step. The acceptor foil is coated with a cover layer 65, and thereon is located a further adhesive 54 which is only applied over part of the area, for example in the form of a macroscopic motif. There thus again result regions 57 with adhesive layer and regions 61 without adhesive layer 54. A further donor foil 20 is coated over the full area with a further transfer layer 31, as represented in FIG. 6e. The transfer layer 31 may likewise be a metal or any other coating. The coating 31 is now transferred to the acceptor foil of FIG. 6d, as explained hereinabove in connection with FIG. 6a and FIG. 6b. In so doing, there is obtained the acceptor foil represented in FIG. 6f. To deactivate the adhesive layer 54, a cover layer 66 is now again applied (FIG. 6g). To the cover layer 66 there is then applied a third adhesive layer 55 over part of the area (FIG. 6i), resulting in adhesive regions 58 and non-adhesive regions 62. To this acceptor foil 50 there is again transferred transfer-layer material in the form of micromotif elements. For this purpose there is employed the donor foil 20 represented in FIG. 6h, which differs from the donor foils represented in FIG. 6a and FIG. 6e only by the kind of transfer coating.

In FIG. 6l there is represented the finished micromotif carrier 45 which was obtained from the acceptor foil 50 after the transfer of the transfer layer 32 and covering with the cover layer 67. FIG. 6k shows the microstructure carrier 46 which was obtained from the donor foil 20 represented in FIG. 6h. In contrast to the method variant represented in FIG. 5, there is obtained from the donor foil 20 no microstructure carrier that is precisely complementary to the microstructure carrier 45 in the method variant according to FIG. 6. There are instead obtained several microstructure carriers 46 that are respectively partly complementary to the microstructure carrier 45.

Unlike the method variant according to FIG. 5 there is also obtained here a microstructure carrier 45 that respectively shows identical views upon viewing from above and upon viewing from below. When there is to be manufactured a microstructure carrier 45 (FIG. 6l) that offers different views, like the microstructure carrier represented in FIG. 5j, then the donor foil 20 in FIG. 6e must be equipped with a two-ply transfer layer, i.e. a transfer layer 32 must be provided on or under the transfer layer 31. When the micromotif elements 30, 31, 32 of different transfer planes partly overlap, this likewise leads to different views upon viewing from above and upon viewing from below.

In the method variant represented in FIG. 6 there cannot be obtained such an exact registration of the motifs as in the method variant represented in FIG. 5. It is hence preferable not to let the individual adhesive layers 53, 54, 55 overlap, because motif jumps or a superimposition of the motifs is to be expected in the overlap region in particular when the microstructure carrier is used as the motif layer of a micro-optic moiré magnification arrangement. However, this disadvantage can also be turned into an advantage, and additional effects produced by the creation of different focal planes. Thus, in particular upon the choice of different motif grids an exactly registered superimposition is normally not required.

For better illustration of the method according to the invention, sectional views of donor foil 20 and acceptor foil 50 are respectively contrasted with the corresponding views in plan view in FIG. 7. There is represented in principle a method variant according to FIG. 4. FIG. 7a shows a plan view of a donor foil 20, "from below" as it were. The carrier foil 21 is embossed here directly, i.e. there is no separate embossed layer, and the embossing consists here, for the sake of simpler representation, in a regular arrangement of rectangles forming elevations. It is evident that the embossing can be configured in the shape of arbitrary patterns, characters or encodings. The donor foil 20 is coated over the full area with a coating 30, which may be an arbitrary coating, for example a metallization or a printed layer. In plan view from below one sees the elevation areal elements 33 and the depression areal elements 34 of the coating, i.e. of the transfer layer. FIG. 7b shows the donor foil 20 of FIG. 7a in cross section along the line A-A'.

FIG. 7c shows the acceptor foil 50 in a plan view from above. The acceptor foil 50 is coated over part of the area with an adhesive layer 53, with a central region 60 in the form of a rectangle remaining free. In this region one looks onto the principal area 52 of the carrier foil 51. FIG. 7d again shows a section through the acceptor foil 50 of FIG. 7c.

In FIG. 7e there is represented in cross section the moment of laminating the two foils 20 and 50. In the adhesive-coated regions 56 of the acceptor foil 50 there result contact regions 70 with the transfer layer 30 of the donor foil 20, while in the adhesive-free region 60 of the acceptor foil 50 there results no contact with the transfer layer 30. Accordingly, no transfer takes place in the region 60.

In FIGS. 7f to 7i there is represented the result of the transfer, FIG. 7f and FIG. 7g showing the microstructure carrier 46 formed from the donor foil 20, and FIG. 7h and FIG. 7i showing the microstructure carrier 45 formed from the acceptor foil 50. In the plan view of the microstructure carrier 46 (FIG. 7f) one now looks, in the previous contact regions 70, onto the free elevation surfaces 25 of the embossed structure, while the coating 30 is still present in all other regions. The elevation surfaces still carry the transfer-layer elevation areal elements 33 in the region 60 as well.

The microstructure carrier 45 formed from the acceptor foil 50 (FIG. 7h) now has a microstructure 40 consisting of the transferred transfer-layer elevation areal elements 33. In the region 60 no transfer layer was transferred. Depending on the pressure upon laminating, the carrier foil 51 can have a slight embossing, indicated by the dotted rectangles. Such an embossing need not remain permanently, however, and can, where applicable, be compensated by subsequent lacquering over, so that it is no longer perceptible to a viewer. The transfer-layer elevation areal elements 33 transferred to the acceptor foil 50 typically constitute slightly raised regions. It is noteworthy here that the extent of raisedness is usually greater than the layer thickness of the transfer-layer elevation areal elements 33. Without this explanation being binding, the reason therefor is presumably a slight swelling of the adhesive layer in these regions in the course of the transfer method. The microstructure 40 and the microstructure 41 of the microstructure carrier 46 are complementary to each other.

A fully identical result can of course be obtained when the acceptor foil 50 is coated with adhesive over the full area and the transfer layer 30 of the donor foil 20 is instead provided only in a corresponding partial region. However, an application of the transfer layer in motif form is not possible with all transfer-layer materials.

FIGS. 8 to 10 show exemplary embodiments of the present invention wherein the embossed structure of the donor foil 20 is additionally combined with a further, finer structuring. Such a tertiary structure is being represented by the example of diffractive microrelief structures carrying holographic information. Also possible are of course other tertiary structures, for example subwavelength gratings or nanostructures, in particular moth-eye structures.

FIG. 8 shows a donor foil 20 with an embossed carrier foil 21 and a transfer layer applied over the full area. The embossed structure of the carrier foil 21 has depression surfaces 26 without an additional tertiary structure and elevation surfaces 81 with a hologram structure. Through the hologram structure the transfer layer is also structured accordingly, so that it has elevation areal elements 33 which likewise have a hologram structure at least on the surface bordering on the elevation surface 81. On the opposite surface a hologram structure can be present or not, depending on the transfer-layer material. Imprinted transfer layers typically have a smooth surface, while vapor-deposited metallizations adopt the hologram structure of the ground. The transfer-layer depression areal elements 34 have smooth surfaces in this embodiment example.

According to a variant not represented here, the depression surfaces can additionally also be provided with the same or a different tertiary structure.

From the donor foil 20 the transfer-layer elevation areal elements 33 with the additional hologram structure are transferred to an acceptor foil 50. This makes the acceptor foil 50 into a micromotif carrier 45 with a micromotif 40. The micromotif 40 has a primary structure which is determined either by the application region of the transfer layer or by the application region of the adhesive layer of the acceptor foil, and also a secondary structure which is determined by the embossed motif of the carrier foil 21, and furthermore a tertiary structure in the form of a hologram. The micromotif carrier 45 can then be combined with a micromotif viewing device, for example with microlenses, into a micro-optic representation arrangement, for example as shown in FIG. 11.

According to an alternative variant, which is represented by way of example in FIG. 9, not the elevation surfaces 25 are equipped with a tertiary structure, but rather the depression surfaces of the embossed structure of a carrier foil 21 of a donor foil 20. Accordingly, the elevation areal elements 33 of the transfer layer are smooth in this embodiment example, while the depression areal elements 34 of the transfer layer can reproduce the hologram structure of the depression surface 83 of the embossing in a structured surface 84. In this case the smooth elevation areal elements 33 of the transfer layer are transferred to an acceptor foil 50, and the microstructure carrier 46 produced from the donor foil 20 is employed for providing a motif layer having a hologram structure for example in a micro-optic representation arrangement. The microstructure carrier 45 from the acceptor foil 50 can of course also additionally serve as a micromotif carrier in a micro-optic representation arrangement.

Alternatively, the depression surfaces as well as the elevation surfaces of the embossed structure can be equipped with a hologram structure or some other tertiary structure.

FIG. 10 shows a further variant wherein the elevations of the embossed structure and the depressions of the embossed structure of a donor foil 20 do not have a regular pattern. In this embodiment example, the elevation surfaces 25 of the embossed structure have no tertiary structure, while the depression surfaces are equipped with different tertiary structures. The transfer layer 30, in FIG. 10 a metallization, therefore possesses non-tertiary-structured elevation areal elements 33, non-tertiary-structured depression areal elements 34 as well as differently tertiary-structured depression areal elements 84', 84'', 84'''. After the transfer of the elevation areal elements 33 to an acceptor foil 50, the microstructure carrier 46 arising from the donor foil 20 can be employed as a security element.

Figure 13:
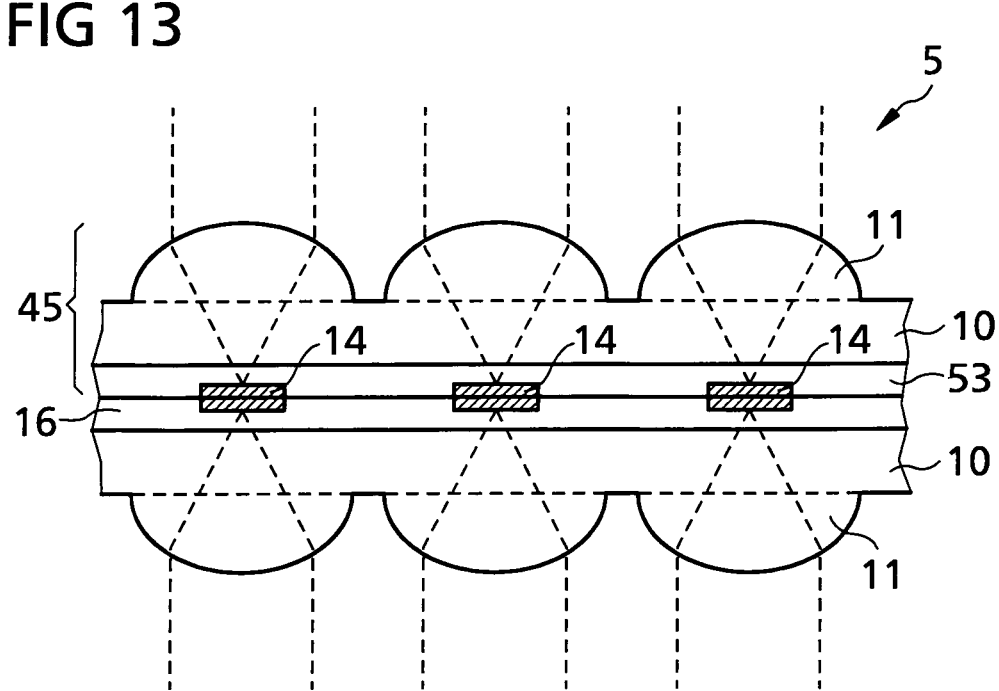

FIGS. 11 and 13 show sections through micro-optic representation arrangements according to the invention for security elements. In FIG. 11 there is represented a moiré magnification arrangement of a security element 5 in which arrangement the micromotif elements are provided by a micromotif carrier 45 according to the invention, as is obtained for example through the transfer of the tertiary-structured elevation areal elements 33 of the donor foil 20 represented in FIG. 8 to an acceptor foil 50. The microstructure carrier 45 has a carrier foil 51 and an adhesive layer 53 to which the micromotif elements are transferred. The lamination to the carrier material 10 provided with microlenses 11 can be effected using an additional adhesive layer not represented here. The micromotif is viewed through the microlenses 11, through which a viewer perceives the embossed motif in magnified form. Upon viewing from the opposite side, the viewer perceives the holographic picture. Because the dimensions of the micromotif, i.e. of the micromotif elements and of the distances therebetween, lie below the resolution limit of the human eye, the viewer perceives the holographic picture as a full-area picture.

FIG. 13 shows an embodiment of a further micro-optic representation arrangement according to the invention wherein microlenses 11 for viewing the micromotif are attached on both sides of the micromotif layer. The micromotif elements 14 consist in this embodiment of transfer-layer elevation areal elements, as are represented for example in FIG. 5*j* (the three micromotif elements from the metallizations 31 and 32 represented on the right in the drawing). These micromotif elements 14 can be prepared on a donor foil 20, as described in FIG. 5, and then transferred to an acceptor foil 50. In the embodiment represented in FIG. 13, the acceptor foil 50 is simultaneously the microlens carrier. The acceptor foil 50 hence consists of the microlens carrier material 10, the microlenses 11, and an adhesive layer 53 to which the micromotif elements 14 are bonded. By means of the adhesive layer 16 a further microlens carrier 10 with microlenses 11 is then bonded on. A viewer then respectively sees moiré-magnified micromotif elements from the two possible viewing directions, whereby the motifs can be identical or different.

According to the invention, the carrier foils preferably employed are foils into which the micro-optic viewing elements such as microlenses are already embossed. The carrier foil can act here both as a donor foil and as an acceptor foil. A particularly preferred embodiment of a micro-optic representation arrangement according to the invention for a security element 5 is represented in FIG. 12. In this embodiment, the micro-optic representation arrangement is manufactured from a carrier foil 10 which is coated on its two opposite surfaces (principal areas) with layers 11', 14' of an embossing lacquer. Microlenses 11 are first embossed into the embossing lacquer layer 11', microstructures are subsequently embossed into the embossing lacquer layer 14', the later micromotif elements being formed in the depressions of the microstructures, i.e. the embossing lacquer layer 14' forms the later micromotif layer 15. After the embossing of the microlenses and of the microstructures, a transfer layer is formed on the microstructures. The procedure is described for example in connection with FIGS. 3 and 4. Subsequently, an acceptor foil coated with an adhesive layer is laminated onto the transfer layer, and the two foils subsequently separated from each other again, for example by separation winding. In so doing, the transfer-layer elevation areal elements remain on the acceptor foil, while the transfer-layer depression areal elements 34 remain behind in the depressions of the microstructure and form the micromotif elements. This state is represented in FIG. 12. In the embodiment represented in FIG. 12, the foil equipped with microlenses is thus employed as a donor foil.

Alternatively, it is also possible to first form the microstructures in the embossing lacquer layer 14' and thereafter form the microlenses 11 in the embossing lacquer layer 11'. According to further alternatives, the microlenses and/or the microstructures can also be embossed directly into an embossable carrier foil. According to further alternatives, the microstructure can also first be embossed, the transfer coating then formed on the microstructure, and the transfer-layer elevation areal elements removed by means of an acceptor foil, and only then the microlenses embossed on the opposite side of the foil or laminated onto the opposite side of the foil. According to further possible alternatives, the foil equipped with microlenses can also be employed as an acceptor foil, i.e. the foil equipped with microlenses on one principal area is coated with an adhesive layer on the opposite principal area, and transfer-layer elevation areal elements are transferred to this adhesive layer from a donor foil in such a way that they form the micromotif elements of the micro-optic viewing device.

Figure 14:
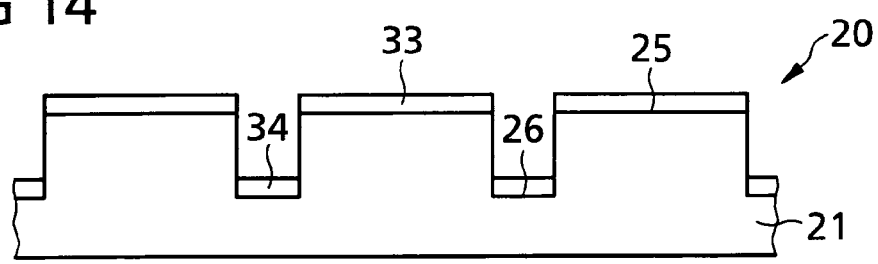

The microstructure carriers according to the invention can provide not only the micromotif layer of a micro-optic representation arrangement, but also the micromotif viewing device. Such a micromotif viewing device, or a precursor thereof, is represented in FIG. 14. A donor foil 20 consists of a transparent carrier foil 21 with an embossed structure having elevation surfaces 25 and depression surfaces 26. Located thereon is an opaque transfer layer having elevation areal elements 33 and depression areal elements 34. When the elevation areal elements 33 are transferred to an acceptor foil 50, there is obtained from the acceptor foil 50 a microstructure carrier 45' whose microstructure forms a hole mask, which can be used as an alternative viewing element instead of microfocusing elements. An advantage of such a hole mask is that no defined focal distance is required, which often poses a certain problem with microlenses 11.

Figure 15:
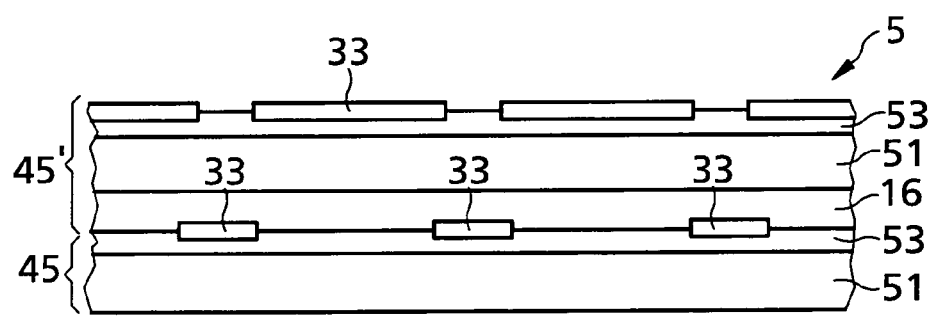

FIG. 15 shows how the microstructure carrier 45' obtained from the transfer of the elevation areal elements 33 of the donor foil 20 of FIG. 14 to the acceptor foil 50 can be combined with a further microstructure carrier 45 into a security element 5 having a moiré magnification arrangement. The microstructure carrier 45 is for example a micromotif carrier as is represented in FIG. 3*f* and FIG. 4*d*. The two microstructure carriers 45 and 45' according to the invention are bonded together by means of an adhesive layer 16.

In FIG. 16 there is represented a method sequence of the method according to the invention for producing a microstructure carrier (analogous to the representation in FIG. 4), the formed microstructures being employed for forming further microstructures using photoresist materials. FIG. 16*a* corresponds to the representation in FIG. 4*c*, and FIG. 16*b* corresponds to the representation in FIG. 4*d*. The microstructure carrier 46 formed from a donor foil has a microstructure of elevation areal elements 33 and depression areal elements 34, and the microstructure carrier 45 formed from an acceptor foil has a microstructure of transferred elevation areal elements 33. The microstructures are preferably metallic microstructures.

FIGS. 16*c*, *e* and *g* show how the microstructure carrier 46 can be equipped with an additional or alternative microstructure using a negatively working photoresist or another composition cross-linkable by irradiation, for example using a UV-cross-linkable lacquer. FIGS. 16*d*, *f* and *h* show how the microstructure carrier 45 can be equipped with additional or alternative microstructures using a negatively working photoresist or another radiation-cross-linkable composition. For this purpose, the microstructure carrier 46 is coated with a photoresist 42 (or an analogously working composition), and the microstructure carrier 45 is coated with a photoresist 43, as represented in FIGS. 16*c* and 16*d*. Subsequently, irradiation is done with light of a suitable wavelength, the irradiation being respectively indicated by the arrows designated by L. It is evident that the microstructures act as an irradiation mask for the irradiation of the resist layer. The opposite surface of the carrier foil 21 or 51 could in principle also be coated with photoresist 42 or 43, whereby irradiation would then accordingly have to be done from the opposite side in order for the microstructures to be able to act as an irradiation mask. Because of the greater distance between microstructures and photoresist, however, the result achieved in this way is less precise than when the photoresist is applied directly to the microstructures.

Through the irradiation, the photoresist cross-links in the irradiated regions and thereby becomes slightly soluble, while remaining readily soluble in the shielded regions. The non-cross-linked, readily soluble regions can hence be washed off with a suitable solvent, thereby obtaining the state represented in FIGS. 16*e* and 16*f*. Here, microstructures 44 or 47 of resist material are present besides the original microstructures of metal. The original metallic microstructures and the microstructures of resist material are complementary to each other. In this way, interesting effects can be achieved in particular through the employment of colored resist materials.

FIGS. 16*g* and 16*h* show the microstructure carriers 46 and 45 after the original metallic microstructures have been etched away. The microstructure carriers now have microstructures 44 or 47 of possibly colored photoresist material which are respectively complementary to the original metallic microstructures. The microstructures 44 can, where applicable, be transferred to the adhesive layer of an acceptor foil like the original microstructures. The same holds for the "combination microstructure" of metallic areal elements 33 and photoresist areal elements 44, which is represented in FIG. 16*e*.

The washing and etching steps can also be carried out simultaneously, where applicable, depending on the employed materials.

As an alternative to negatively working photoresist materials, there can also be employed positively working photoresist materials. Positively working photoresist materials are so changed by irradiation that they become more readily soluble in the irradiated regions. Hence, when a microstructure carrier 46 is coated with a positively working photoresist, as is shown for a negative photoresist in FIG. 16c, there arises, after irradiation (as in FIG. 16c) and washing away of the more readily soluble regions of the photoresist, the microstructure carrier 46 represented in FIG. 16i with mutually congruent metallic microstructures 33, 34 and photoresist microstructures 48. Analogously, there arises from a microstructure carrier 45 the microstructure carrier 45 represented in FIG. 16j with metallic microstructures 33 and photoresist microstructures 49 congruent therewith. When transparent carrier foils are employed, such microstructures are visible from both sides of the carrier foil, but in one case a viewer sees the metallic microstructure and in the other case an identical, possibly colored, microstructure. The microstructure carriers are advantageously equipped on both surfaces with microlenses or other micromotif viewing elements, the backing with a colored photoresist making the metallic microstructures appear especially brilliant, as to be explained more closely in connection with FIGS. 28 and 29.

When the positively working photoresist material is not applied on the side of the metallic microstructures, as shown in FIGS. 16i and 16j, but on the opposite side of the carrier material, and irradiation is subsequently done from the side of the metallic microstructures, the photoresist microstructures congruent with the metallic microstructures are accordingly formed on the opposite side of the carrier foils. In this case it is possible to etch away the metallic microstructures, so that only photoresist microstructures are present.

The microstructuring of photoresist materials while employing metallized regions as an exposure mask is described extensively in DE 10 2008 036 481.9. With regard to suitable materials and process conditions as well as the attainable effects, reference is made to this application.

FIGS. 17 to 27 show "combination security elements" or micro-optic "combination representation arrangements" as well as their manufacture and mode of action. Micro-optic combination representation arrangements have at least a first micro-optic representation arrangement and a second micro-optic representation arrangement which are different from each other. The first micro-optic representation arrangement and the second micro-optic representation arrangement preferably complement each other to form a total motif.

It is particularly preferable to combine with each other representations with directional reflection and stereographic representations with depth information.

"Stereographic representations with depth information" are understood in the present invention to be representations wherein a 3D effect is produced by presenting to a viewer's left and right eyes different views of an object that respectively show the object viewed from the corresponding direction. These different views yield a three-dimensional impression for a viewer, as to be explained in connection with FIG. 19. Representations of this kind can also offer more than only two different views, thereby usually also yielding a parallax, i.e., upon rotation or tilting, the picture components in the foreground move relative to the picture components in the picture background. In some cases one can for example, upon rotation or tilting, also look behind an object located in the foreground.

The most well-known stereographic representations with absolute depth information are three-dimensional holograms, for example the classical directly exposed holograms or computer-generated stereograms. Further examples are microlens tilt images as well as modulo and moiré magnification arrangements with a "deep" or "floating" effect, as are known from WO 2009/000528 and WO 2005/052650.

Figure 20:
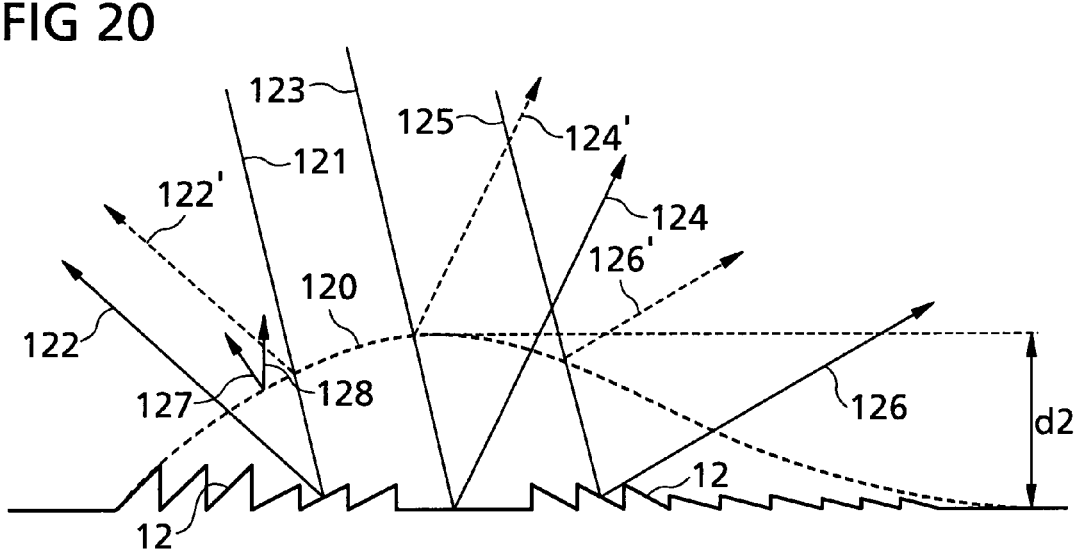

"Directionally reflective representations" are understood in the present invention to be in particular representations that simulate to a viewer through directional reflection a bulge which yields a depth impression or a 3D impression only indirectly. FIG. 20 explains the manner of functioning of such representations. In contrast to the above-mentioned stereographic representations, the directionally reflective representations do not show a parallax, and the represented objects cannot readily be represented in such a way that they seem to lie in front of or behind a certain reference plane, for example a reference plane formed by a security element. The representations permit in particular no absolute depth information, but only a relative "front/back" association which is based substantially on the experience of the viewer who implicitly assumes further information: When an area appears to a viewer to bulge toward the front, the viewer concludes that the central region of the bulged area must be located further frontward from his perspective than the edge area. When a representation A partly covers another representation B, a viewer concludes that the affiliated object A must be located in front of the object B.

Directionally reflective representations are for example reflective Fresnel structures appearing to bulge in lens-like fashion (see EP 1 570 422 and EP 1 562 758), diffractive achromatic elements with a bulge effect (see EP 1 782 108), seemingly bulged matt-structure grating images, and in particular representations based on microscopic sawtooth gratings. Using microscopic sawtooth gratings there can be produced seemingly bulged representations (PCT/EP 2010/007368), "noisy" representations (PCT/EP 2010/007369) and representations with kinematic effects (EP 0 868 313).

These directionally reflective representations have in common that an at least partly mirror-coated surface that is practically planar on a relatively large length scale violates the law "angle of incidence=angle of reflection" tacitly assumed by a viewer on a relatively large length scale, for example by the incident light being diffracted through diffraction effects in directions not expected by the viewer, or being reflected through micromirrors unrecognizable with the naked eye in directions not expected by the viewer.

Directionally reflective representations and stereographic representations respectively have very characteristic properties and their individual characteristic appearance. It is a special advantage of directionally reflective representations that they can simulate for example the typical luster of bulged metallic surfaces with high brilliance, a viewer even being able to recognize his own mirror image on the simulated bulged metallic surfaces if they are accordingly designed. The advantage of the stereographic representations lies in turn in the "genuine" three-dimensionality of the representation. The security elements according to the invention preferably unite both kinds of representation, thereby making it possible to achieve optically extremely attractive effects, which give the security elements an especially high recognition value and make them difficult to imitate. The microstructures of the stereographic representations, and, where applicable, also the directionally reflective surfaces of the directionally reflective representations, can be manufactured in simple fashion by means of the method according to the invention. Hereinafter some implementation variants of micro-optic combination representation arrangements for security elements according to the invention will be briefly explained.

FIG. 17a shows the security element 6 of FIG. 1 in plan view. The security element 6 has a first motif portion 7 and a second motif portion 8, the first motif portion 7 being a stereographic representation and the second motif portion 8 being a directionally reflective representation. A section through the security element 6 is represented in FIG. 18.

As can be seen in FIG. 18, the security element 6 is formed by a foil 10 which is coated on both sides with embossing lacquer layers 11', 14'. An embossed structure was embossed into the embossing lacquer layer 14', the embossed structure coated with a metallic transfer layer, and the transfer-layer elevation areal elements then transferred to an acceptor foil, as described for example in connection with FIG. 3 and FIG. 4. The transfer-layer depression areal elements remained behind in the depressions of the embossed structure and now form the micromotif elements 14.

There are embossed into the embossing lacquer layer 11' two different structures, namely, microlenses 11 and facets 12, the facets 12 being mirror-coated and forming a sawtooth structure. The microlenses 11 form together with the micromotif elements 14 a first micro-optic representation arrangement 17, which is a stereographic representation with depth information, for example a moiré magnification arrangement.

The manner of functioning of the first micro-optic representation arrangement 17 is explained schematically in FIG. 19. When a viewer views the bank note 1 (FIG. 1), he sees in plan view of the security element 6 in the first motif portion 7 an object represented in point form in FIG. 19, the right eye (RA) seeing the object at a different place from the left eye (LA). With the left eye the viewer sees the view of the object from the direction 115, while with the right eye he sees the view from the direction 114. Consequently, the right eye perceives the object at the place 112, while the left eye sees the object at the place 113. The viewer extends the straight lines 114 and 115 up to the intersection point 116 and concludes that the represented object is located at the depth d1 behind the plane of the bank note 1. In the second motif portion 8 the viewer perceives a representation with bulged surfaces, in this embodiment example a three-dimensionally formed portrait. This effect is obtained by the sawtooth structure of mirror-coated facets 12 of different shape and arrangement. The manner of functioning of this second micro-optic representation arrangement 18 is explained in FIG. 20.

As shown in FIG. 20, the incident light beam 121 is reflected in the direction 122, which is parallel to the direction 122' which would correspond to the direction upon reflection on the surface 120. The same holds for the light beams 123 and 125, which are reflected in the directions 124 and 126. These directions 124 and 126 are parallel to the directions 124' and 126' which would be the reflection directions upon reflection on the surface 120. The facets 12 are dimensioned such that a viewer cannot resolve them without auxiliary means. Thus, in the direction perpendicular to the drawing plane, the facets 12 can have dimensions of for example 15 μm and a height of for example 5 μm.

From the reflection behavior of the second micro-optic representation arrangement 18, a viewer concludes that the bulged surface 120 with the depth d2 is present in the second motif portion 8, whereby several bulged surfaces must of course be simulated upon the representation of a three-dimensional portrait. For the light beam 121 the reflection behavior suggests that the local surface normal points in direction 127, which is clearly different from the actual macroscopic surface normal.

By means of directional reflective representations there can also be achieved movement effects, for example by constructing representations from several sawtooth-structure representations, the individual sawtooth-structure representations being respectively visible from different angles of view. An example thereof is shown in FIG. 17b.

FIG. 17b shows a security element 6' in plan view which has a star consisting of four lines 63, 64, 68, 69. The lines 63, 64, 68 and 69 respectively consist of sawtooth structures with facets, the sawtooth structures possessing different relief structures. The parameters of the relief structures are so chosen that the lines 63, 64, 68 and 69 are respectively visible only from certain angles of view. Hence, when the security element 6' is tilted or rotated, a different one of the lines 63, 64, 68, 69 is respectively visible to a viewer, which the viewer perceives as a movement effect. The background of the represented star can for example be enriched by an additional stereographic representation.

Figure 21:
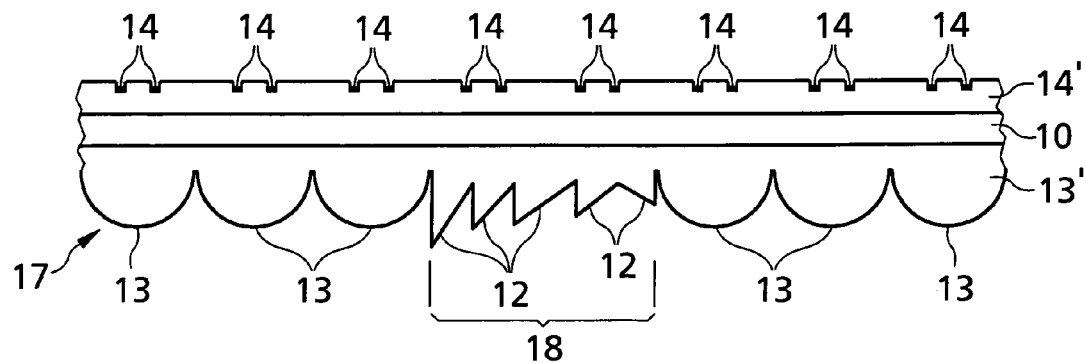

FIG. 21 shows a modification of the micro-optic combination representation arrangement for a security element according to the invention wherein the first micro-optic representation arrangement 17 has, instead of the microlenses 11 (FIG. 18), concave micromirrors 13 which are formed by embossing the embossing lacquer layer 13' and applying a mirroring coating. The second micro-optic representation arrangement 18 configured as facets 12 in this embodiment example is also formed in the embossing lacquer layer 13'. The facets 12 can be manufactured in the same way as the concave micromirrors 13 by embossing and mirror-coating.

The microstructures or micromotif elements 14 can be provided not only in the region of the first micro-optic representation arrangement 17, but also in the region of the second micro-optic representation arrangement 18. In this case, and when the micromotif elements 14 are colored, the bulged mirroring surface which is simulated by the facets 12 likewise appears slightly colored. This of course does not hold only for the embodiment according to FIG. 21, but quite generally.

Figure 22:
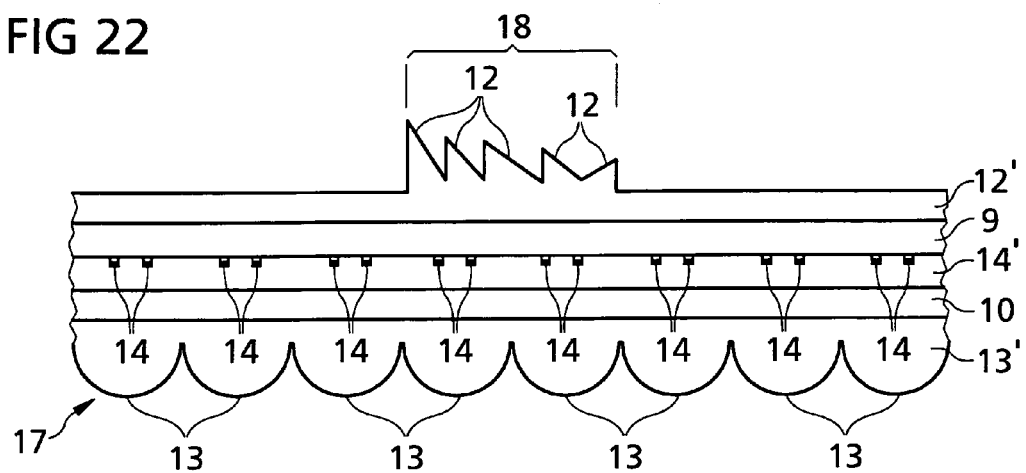

In FIG. 22 there is shown the construction of a micro-optic combination representation arrangement wherein the concave micromirrors 13, the microstructures 14 and the facets 12 are respectively each embossed into their own embossing lacquer layers 13', 14' and 12'. Between the embossing lacquer layers 13' and 14' there is located a first carrier foil 10, and between the embossing lacquer layers 14' and 12' there is located a second carrier foil 9. In this embodiment, the first micro-optic representation arrangement 17 and the second micro-optic representation arrangement 18 are manufactured separately and then laminated.

Figure 23:
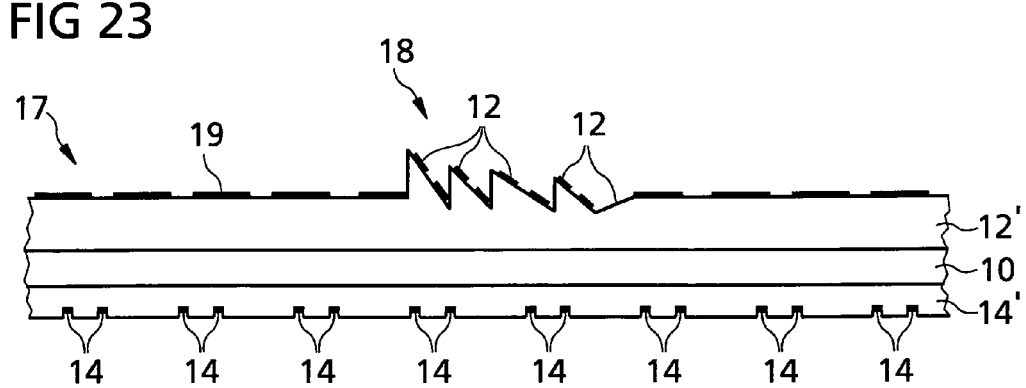

In particular upon a viewing of a security element in transmitted light against a bright light source, the first micro-optic representation arrangement 17 can also have merely a hole grid 19, as shown in FIG. 23, instead of a microfocusing element grid (grid of microlenses or of concave micromirrors). Such a hole grid 19 can be realized for example by periodically arranged holes or slots in an opaque, for example reflectively metallized, layer. The holes here can be small gaps. In the represented embodiment, the hole grid also extends into the region of the second micro-optic representation arrangement 18, so that a superimposition of the representations results here. The hole grid can of course also be absent in the region 18.

Further, in the security elements according to the invention, the second micro-optic representation arrangement 18 can also be realized by means of diffractive structures. Thus, preferably asymmetric diffraction gratings are so arranged in the second motif portion 8 that the reflection behavior of a bulged surface is simulated as achromatically as possible, as described for example in WO 2006/013215, whose disclosure in this connection is hereby incorporated by reference.

In the micro-optic combination representation arrangements, the two motif portions 7 and 8 can overlap at least partly. Alternatively or additionally, the two motif portions 7 and 8 can also be mutually interlaced in certain regions. Thus, the areas of the two motif portions 7 and 8 can for example be broken down into complementary areal elements and subsequently united into a total motif. In so doing, each motif portion loses a portion of its picture information, which portion is replaced in the areal elements in question by the picture information of the respective other areal element. When the dimensions of the areal elements are below the resolving power of the eye, the viewer perceives the individual impressions of the two motif portions simultaneously and processes them into a total motif.

Using directionally reflective representations there can also be realized glitter effects and movement effects, for example movement effects like the "rolling bar" or "double rolling bar" effects stated in U.S. Pat. No. 7,517,578. Such effects are described in the application PCT/EP2010/007369. This application discloses security elements with a carrier having a reflective areal region which is divided into a multiplicity of reflective pixels, the area of each pixel being at least one order of magnitude smaller than the area of the reflective areal region, each pixel having at least one reflective facet formed in a surface of the carrier, the at least one reflective facet reflecting light incident on the areal region along a predetermined direction directionally in a reflection direction predefined by the facet's orientation, the orientations of the facets of different pixels having a substantially random variation over the reflective areal region.

"Pixels" are understood to be small partial regions of the reflective areal region, which can not only have an arbitrary outline form, but in particular also need not be arranged on a regular grid. The facets form a periodic or aperiodic sawtooth grating structure.

Figure 24:
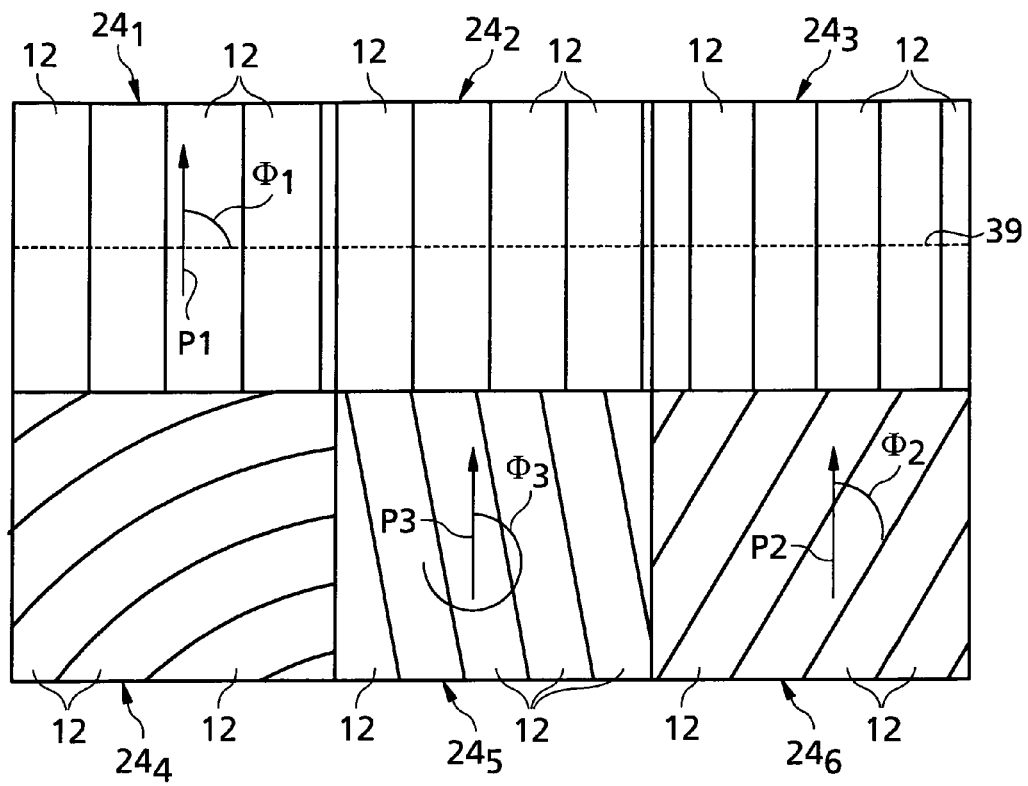
Figure 25:
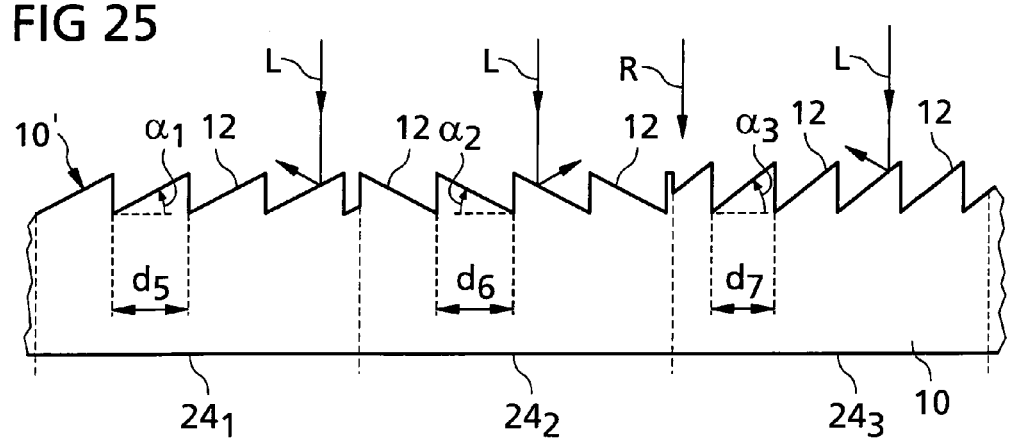

FIG. 24 represents an areal region, divided into pixels, of such a security element in plan view, and FIG. 25 is a sectional view of the micro-optic representation arrangement of FIG. 24 along the line 39.

FIG. 24 shows a detail of a reflective areal region which is divided into a multiplicity of reflective pixels 24 of which a small portion is represented enlarged in FIG. 24 as a plan view. The pixels 24 are square here and have an edge length in the range of 10 to several 100 μm. Preferably, the edge length is no greater than 300 μm. In particular, it can lie in the range between 20 to 100 μm.

Each pixel 24 has several reflective facets 12 of identical orientation in the embodiment described here. The facets 12 are the inclined areas of a reflective sawtooth grating. In a modification not represented, however, it is also possible that several or all pixels 24 respectively only have a single facet 12.

In FIG. 25 there is represented the sectional view along the line 39 for three neighboring pixels $24_1$, $24_2$, $24_3$. The reflective coating on the facets 12 is not drawn in. The sawtooth grating of the pixels $24_1$, $24_2$ and $24_3$ is formed in an upper side 10' of a carrier 10, the thus structured upper side preferably being coated with a reflective coating.

As to be seen in FIG. 25, the inclination a of the facets 12 is identical in each individual pixel $24_1$, $24_2$, $24_3$. However, the inclination of facets 12 of neighboring pixels $24_1$, $24_2$, $24_3$ is different. Furthermore, the grating period $d_7$ of the sawtooth structure of the pixel $24_3$ is also different from the grating periods $d_5$ and $d_6$ of the sawtooth structures of the pixels $24_1$ and $24_2$. Due to the different orientation of the facets 12 of the individual pixels $24_1$, $24_2$ and $24_3$, light L incident along a predetermined direction R is reflected by each pixel $24_1$, $24_2$, $24_3$ directionally in different reflection directions, as represented schematically in FIG. 25. Because the facets 12 of the pixels 24 are always oriented differently, there is obtained for the viewer a glittering effect or an effect comparable to a metallic lacquering.

The different orientation of the facets 12 can be adjusted not only by the choice of the angle of inclination α of the facets 12, but also by different azimuth angles Φ. Based on the direction according to the arrow P1 in FIG. 24, the azimuth angle Φ of the facets 12 of the pixels $24_1$, $24_2$ and $24_3$ amounts respectively to 90°.

The azimuth angle of the facets 12 of the pixel $24_6$, however, amounts to approx. 120° (based on the direction of the arrow P2), and the azimuth angle $Φ_3$ of the facets of the pixel $24_5$ amounts to 280° (based on the direction of the arrow P3).

The azimuth angles can for example be chosen randomly for the individual pixels 24. In particular, random values between 0 and 360° can be selected. For the slope a of the facets 12 there can be chosen for example values from the range of 10° to 20° as well as from the range of −20° to −10°. It is also possible to choose the slope of the facets from a region of for example −20° to 20°. Here, too, the slopes can again be chosen randomly.

It is possible that the randomly chosen slope α corresponds to a normal distribution. The randomly chosen azimuth angles Φ can in particular be uniformly distributed. The grating period or width of the sawteeth d preferably lies above 1 μm and in particular above 3 μm. Further, the grating period d can also lie above 5 μm. However, it is preferably always so chosen that at least two facets 12 are present per pixel 24. In particular, at least three, four or more facets 12 can be contained per pixel 24.

The facets 12 are preferably configured as planar area elements. It is also possible, however, that the facets 12 are curved (e.g. concave or convex). The facets 12 can extend in a straight line, as with the facets 12 of the pixels $24_1$, $24_2$, $24_3$, $24_5$ and $24_6$. However, a non-straight course (e.g. slightly curved) is also possible, as schematically shown for the pixel $24_4$ in FIG. 24.

Using the division of the pixels there can be produced the impression that a "noisy" area is present (preferably in a reflective area). Additionally, the facets of the pixels can be oriented such that there occurs from certain viewing angles a simultaneous bright lighting up of many pixels. For this purpose, the reflective areal region on the carrier is divided into at least two partial regions, so that the pixels in the first partial region have a random orientation, while the pixels of the second or the further partial regions all have the same or at least almost the same orientation respectively per partial region. The light from a light source is then scattered in all directions from many angles in the first partial region, while the light is respectively reflected in a narrow angular range in the further partial regions. A viewer then sees only a noisy representation with randomly lighting up pixels (glitter effect) at most angles, while the further partial regions light up very brightly at certain angles.

When optical effects like the "rolling bar" or "double rolling bar" effects stated in U.S. Pat. No. 7,517,578 are to be simulated, the orientation of the facets is chosen such that the reflective areal region has a continuous course of the average reflection direction of the pixels. This causes different areal regions to light up brightly continuously in succession upon tilting of a security element with the reflective representation, so that the effect of a stripe rolling upward or downward or toward one side is achieved.

FIGS. 26 and 27 show method variants for manufacturing micro-optic combination representation arrangements according to the invention with a first and a second micro-optic representation arrangement. Respectively shown are foil materials with preembossed lenses and with sawtooth structures as the second representation arrangement, metallizations as the transfer layer or micromotif elements or as the reflective layer, as well as embossings into separate embossing lacquer layers. It is evident that microfocusing elements other than lenses can also be employed, that the microfocusing elements and microstructures can also be embossed directly into embossable foils, that microfocusing elements can also be laminated on later, that structures other than sawtooth structures can be employed as the second representation arrangement, and that transfer layers other than metallizations can be employed. The figures merely explain the basic principle of manufacture.

FIG. 26b shows, in cross section, an acceptor foil 50 having a carrier foil 10, an embossing lacquer layer 11' and an embossing lacquer layer 12'. Embossed into the embossing lacquer layer 11' are microlenses 11 in the regions 7'. The regions 7' are the later motif regions of the first micro-optic representation arrangement. Embossed into the embossing lacquer layer 12' are sawtooth structures in the region 8'. From the sawtooth structures the second micro-optic representation arrangement will later be formed. The embossing lacquer layer 12 is coated with an adhesive 53. The adhesive layer is very thin in order for it to readily follow the structures of the facets or sawteeth and not "smear up" the structures.

FIG. 26a shows a donor foil 20 in principle in the same state as the donor foil in FIG. 4a. The donor foil 20 has a carrier foil 21 and an embossing lacquer layer 23. Microstructures are embossed into the embossing lacquer layer 23 and already equipped with a transfer layer. In the region 8" the microstructure has a large-area elevation. The transfer layer forms elevation areal elements 33 and depression areal elements 34 in the regions 7" and an extended elevation areal element 33' in the region 8". The regions 7" correspond to the regions 7' in the acceptor foil of FIG. 26b, and the regions 8" correspond to the region 8' in the acceptor foil of FIG. 26b.

The donor foil 20 is laminated onto the acceptor foil 50, i.e. the regions 7" are laminated onto the regions 7', and the region 8" is laminated onto the region 8'. In so doing, the transfer-layer elevation areal elements 33 are transferred to the adhesive 53, thereby forming the micromotif elements 14, and the elevation areal element 33' is transferred to the sawtooth structure, thereby forming the reflective coating 88. This state is represented in FIG. 26c. Typically there is not obtained as perfect a coating 88 as represented in FIG. 26c. In particular, the lower regions of steep sawteeth are in practice often not completely coated. However, this does not matter because relatively small defects of the coating remain concealed from a viewer.

The micro-optic combination representation arrangement for a security element 6, as represented in FIG. 26c, now has a stereographic representation 17 with depth information, and a directionally reflective representation 18. In the region of the micro-optic representation arrangement 18 no lenses 11 are embossed. The absence of focusing elements is recommendable when there is employed a coating 88 whose effects are also to be visible from the side of the focusing elements, for example in the case of coatings with a color-shift effect. Instead of leaving out the microfocusing elements in the corresponding region, their effect can, where applicable, also be eliminated by overprinting with a suitable colorless lacquer, whereby the lacquer employed for overprinting should if possible have the same refractive index as the material of the microfocusing elements.

Alternatively, manufacturing variants are also conceivable wherein the sawtooth structure already has a metallization or other coating, and only the first micro-optic representation arrangement 17 is to be manufactured by transferring micromotif elements 14 into the first motif region 7. In such a case the region 8" of the donor foil 20 preferably has no embossed structure with an elevation area. When this region is microstructured, for example like the regions 7", elevation areal elements are transferred to the already coated sawtooth structure. Such micromotif elements in the region 8 are hardly visible and undisturbing, if the coating 88 is a metallization. In the case of other coatings they can also be visible, where applicable.

FIG. 27 shows the case in which a micro-optic representation arrangement analogous to the representation arrangement of FIG. 26 is manufactured, but not on an acceptor foil, but rather on a donor foil. The donor foil 20 is represented in FIG. 27b. It has a carrier foil 10, an embossing lacquer layer 11 and an embossing lacquer layer 14'. Embossed into the embossing lacquer layer 11' are microlenses 11 in the regions 7'. A microstructure is embossed into the embossing lacquer layer 14' in this region and metallized. In the region 8, i.e. in the second motif region, a sawtooth structure with a metallization 88 is formed. The sawtooth structure is located deeper than the microstructure in the region 7' in this embodiment example.

FIG. 27a shows an acceptor foil 50 from a carrier foil 51 which is coated with an adhesive 53. In this embodiment example, the adhesive coating extends over the full area. The foil 50 is laminated with the adhesive layer onto the microstructure layer of the donor foil 20 and subsequently removed again by separation winding. The thereby obtained state of the donor foil 20 is represented in FIG. 27c.

As to be seen in FIG. 27c, the elevation areal elements 33 of the donor foil 20 were removed, while the depression areal elements 34 remained behind, and now form the micromotif elements 14 in the first motif regions 7. The micro-optic combination representation arrangement for a security element 6, as is represented in FIG. 27c, otherwise corresponds to the representation arrangement of FIG. 26c.

When the second motif region 8 is not located deeper than the first motif region 7, as represented in FIG. 27b, but lies at approximately the same height as the motif region 7, the adhesive layer 53 should be formed only in the partial regions 7" of the acceptor foil 50. The partial regions 7" correspond to the partial regions 7' of the donor foil 20. In this way, portions of the coating 88 are prevented from being removed by the adhesive layer. Should certain portions of the coating 88 nevertheless be removed upon transfer, this is normally disregardable since relatively small defects are not noticed by a viewer.

It should be mentioned that the second motif portion 8 need not necessarily be structured. When, for example, the acceptor foil 50 represented in FIG. 26b is completely smooth on the surface where the adhesive layer 53 is applied, a smooth metallized area arises in the second motif region 8. Such a relatively large area does not move upon tilting of the security element, while a movement seems to take place in the case of the first micro-optic representation arrangement 17.

Figure 28:
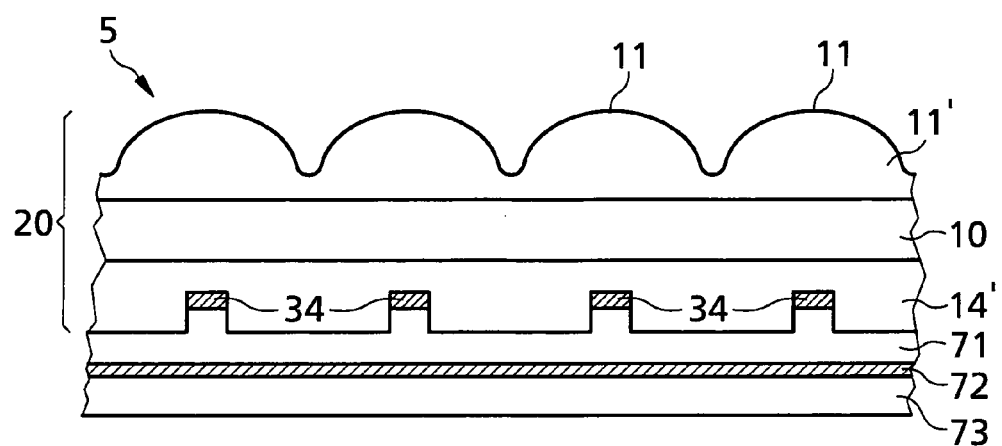
Figure 29:
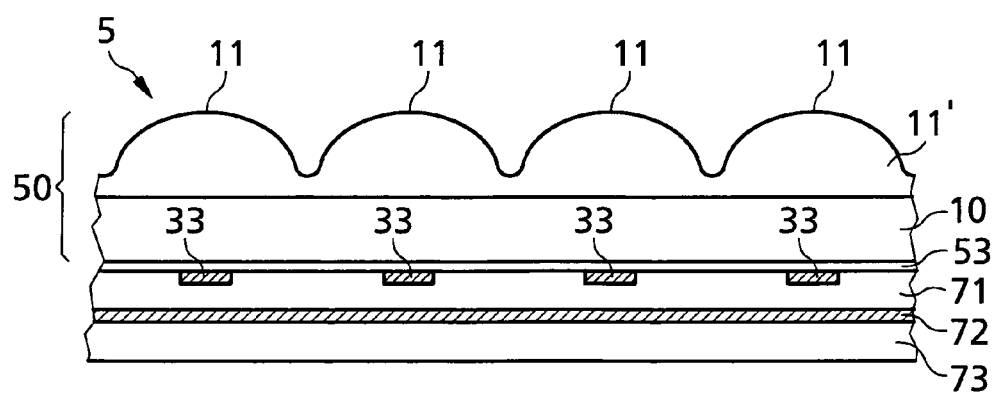

Especially advantageous embodiments of the present invention are represented in FIGS. 28 and 29. The represented security elements have micro-optic representation arrangements (moiré magnification arrangements) with metallic micromotif elements which are backed with color. Additionally, the colored layer is backed with a reflective layer.

Metallic microstructures, in particular silvery metallic microstructures, normally show poor contrast on a white background. According to the invention they are hence preferably backed with a colored background. For example, the microstructures produced by removing superfluous metallized regions from a donor foil (leaving behind the micromotif elements) or by transferring micromotif elements to an acceptor foil in the method according to the invention can be printed with a printing ink.

The backing with color inks can be effected over the full area or in certain regions as well as in single-colored or multicolored fashion. A single-colored background is expediently so chosen that it strongly differs in color tone from the color tone of the micromotif. The stronger the difference in color tone, the better the contrast enhancement of the moiré-magnified micromotifs or other micromotifs.

With a multicolored design of the background, additional effects can be achieved. A multicolored background does not move upon tilting of a security element having a micro-optic representation arrangement with a stereographic representation, but forms, through its structuring, a reference point against which the movement of the stereographic representation is especially striking. For example, a moiré magnification arrangement can display metallic symbols or characters against a different-colored background. Against this static multicolored background the metallized moiré-magnified structures move upon tilting of the security element.

In a security element such as a security thread, the regions with different coloration can extend for example side by side (parallel) in the thread direction, or alternatively extend one behind the other in the thread direction, so that differently colored regions alternate in the direction of the thread. The alternation can be effected in a periodic or aperiodic manner.

The colors are not limited in any special way. There come into consideration totally covering as well as glazing colors. The colors can be water-based or solvent-based, dry physically (drying through evaporation of the liquid components) or be UV-curable. The application of different colors can also take place in overlap. Through gridding there can be produced continuous color transitions between colors printed one over the other. There can also be imprinted, instead of color inks, for example fluorescent inks, systems with a color-shift effect such as for example inks with thin-film pigments, or compositions with other effect pigments.

Colors that are not completely covering can be considerably enhanced in their luminance by being backed by special, generally reflective, layers. As reflective layers there come into consideration for example metallic layers, color-shifting systems, high-refractive coatings and printable layers with metal pigments or effect pigments. Suitable metals are for example aluminum, copper, chromium, tin, zinc, silver and gold as well as metal alloys. High-refractive coatings are for example coatings of ZnS or TiO$_2$.

The reflective coating can, like the color layer, be applied over the full area or in certain regions. When the reflective coating is applied only in certain regions, the contrast arising between regions with and regions without a reflective coating is low in plan viewing and stronger in transmission. In transmission there can thus be produced an effect coming close to a negative script (if the carrier material is transparent).

When the background color is absent in certain regions, the reflective coating is directly visible there. With such a background design, colored regions alternate with reflective regions.

FIG. 28 shows a security element 5 having a moiré magnification arrangement constructed similarly to the security element represented in FIG. 27c, but without its micro-optic representation arrangement 18. The micro-optic representation arrangement of the security element 5 has a carrier foil 10 which is coated on both sides with embossing lacquer layers 11', 14'. Embossed into the embossing lacquer layer 11' are microlenses 11, and embossed into the embossing lacquer layer 14' is a microstructure whose metallized depressions (depression areal elements 34) form the micromotif elements. The microstructure is printed with a color ink 71, and the color ink is in turn printed with a layer 72 with metal pigments. In the represented embodiment, there is further provided a layer 73 of heat seal lacquer for connecting the security element to an object of value. The depressions of the embossed structure can be substantially deeper than the layer thickness of the color ink.

FIG. 29 shows a similar representation to FIG. 28, the micromotif elements being formed here by elevation areal elements 33. In other words, while the micromotif elements were formed in a donor foil 20 in FIG. 28, they were transferred to an acceptor foil 50 in the embodiment according to FIG. 29. This corresponds to an embodiment according to FIG. 26c without the micro-optic representation arrangement 18. The security element 5 represented in FIG. 29 has a carrier foil 10 with an embossing lacquer layer 11' and microlenses 11 embossed therein. On the side of the carrier foil opposite the microlenses 11 are located the micromotif elements formed by the elevation areal elements 33 transferred to the adhesive layer 53. Here, too, the contrast, and thus the visibility, of the metallic microstructures 33 is enhanced by a printing with color ink 71. To increase the luminance of the color ink, an additional metallization 72 is provided. By means of the layer 73 of heat seal lacquer, the security element 5 can be bonded to an object of value.

It is evident that here, too, microfocusing elements other than lenses can be employed, that the microfocusing elements need not already be preembossed on the carrier foil but can also be laminated on, that a security element can have further functional layers, etc. FIGS. 28 and 29 are merely intended to illustrate the principle of backing a microstructure manufactured according to the invention with a color layer and, where applicable, with an additional reflective layer.

The invention claimed is:

1. A method for producing a microstructure on a carrier, comprising the steps:
    (a) manufacturing a donor foil by
    (a1) forming an embossed structure having elevation surfaces and depression surfaces at least in a partial region of a principal area of a first foil material or in an embossable layer on at least a partial region of a principal area of a first foil material, at least one of the elevation surfaces and the depression surfaces forming a desired microstructure,
    (a2) applying a coating at least to a partial region of the embossed structure to form a transfer layer, the transfer layer comprising transfer-layer areal elements on elevation surfaces of the embossed structure, transfer-layer areal elements on depression surfaces of the embossed structure, and transfer-layer areal elements connecting the elevation areal elements and the depression areal elements,
    (b) manufacturing an acceptor foil by applying an adhesive layer at least to a partial region of a principal area of a second foil material,
    (c) laminating the donor foil and the acceptor foil by using the adhesive layer in such a way that at least a partial region of the coated embossed structure and a partial region of the adhesive layer come in contact with each other, the transfer layer on elevation surfaces bonding to the adhesive layer of the acceptor foil in the contact region,
    (d) transferring the areal elements of the transfer layer on elevation surfaces of the embossed structure of the donor foil in the contact region to the adhesive layer of the acceptor foil by separating the donor foil and the acceptor foil from each other, through which, either or both, there arises from the acceptor foil a first microstructure carrier with a first microstructure having the transferred transfer-layer elevation areal elements, and there arises from the donor foil a second microstructure carrier with a second microstructure, the second microstructure being the microstructure from step (a) without the transfer-layer elevation areal elements transferred to the acceptor foil.

2. The method according to claim 1, wherein, in step (a2), there is formed a transfer layer having identical or different elevation areal elements and identical or different depression areal elements.

3. The method according to claim 1, wherein, in step (a2), the transfer layer is applied, in the form of a single-colored or multicolored motif, there being coated the total embossed structure or only a partial region of the embossed structure.

4. The method according to claim 1, wherein, in step (a2), the transfer layer is vapor-deposited.

5. The method according to claim 1, wherein, in step (a2), the coating forming the transfer layer is applied to the total embossed structure, a partial region of the embossed structure being coated with a transfer-layer detachment coating before step (a2), and the coating applied to the total embossed structure being removed in the region located over the transfer-layer detachment coating after step (a2).

6. The method according to claim 1, wherein, step (a2) and, where applicable, the steps of coating with the transfer-layer detachment coating and of removing the coating over the transfer-layer detachment coating are repeated at least once, different partial regions of the embossed structure being coated so as to form different transfer-layer elevation areal elements and different transfer-layer depression areal elements.

7. The method according to claim 1, wherein, a multi-ply transfer layer is formed at least on a partial region of the embossed structure.

8. The method according to claim 1, wherein, all elevation areal elements of the transfer layer of the donor foil are transferred into the adhesive layer of the acceptor foil in one operation.

9. The method according to claim 1, wherein, the sequence of the steps (a2), (b), (c) and (d) is repeated at least once, the adhesive layer being respectively applied to different partial regions of the principal area of the second foil material in step (b).

10. The method according to claim 1, wherein, an additional structuring is incorporated into at least one of the elevation surfaces and into the depression surfaces of the embossed structure in step (a).

11. The method according to claim 10, wherein the additional structuring is transferred into the adhesive layer of the acceptor foil.

12. The method according to claim 1, wherein,
the first microstructure carrier or the second microstructure carrier is coated on a surface at least in a partial region with a UV-cross-linkable lacquer or a negatively working photoresist, so that the microstructure and the coating of UV-cross-linkable lacquer or negatively working photoresist overlap each other at least partly, regarded perpendicularly to the surface of the microstructure carrier, the coating of UV-cross-linkable lacquer or negatively working photoresist is irradiated with radiation of a suitable wavelength while employing the microstructure as an irradiation mask, so that the coating cross-links in the regions not shielded by the microstructure, the non-cross-linked regions of the coating are removed, thereby forming a microstructure carrier with a microstructure and a microstructure complementary thereto of UV-cross-linked lacquer or negatively working photoresist, and optionally the microstructure is removed, while the microstructure complementary thereto of UV-cross-linked lacquer or negatively working photoresist remains behind, wherein the UV-cross-linkable lacquer and the negatively working photoresist can be colored or colorless, or comprises different-colored UV-cross-linkable lacquers or photoresists.

13. The method according to claim 1, wherein
the first microstructure carrier or the second microstructure carrier is coated on a surface at least in a partial region with a positively working photoresist, so that the microstructure and the coating of positively working photoresist overlap each other at least partly, regarded perpendicularly to the surface of the microstructure carrier, the coating of positively working photoresist is irradiated with radiation of a suitable wavelength while employing the microstructure as an irradiation mask, so that the coating is changed photochemically in the regions not shielded by the microstructure, the photochemically changed regions of the coating are removed, thereby forming a microstructure carrier with a microstructure and a microstructure congruent therewith of positively working photoresist, and optionally the microstructure is removed, while the microstructure congruent therewith of positively working photoresist remains behind, wherein the positively working photoresist is colorless or colored, or comprises different-colored photoresists.

14. The method according to claim 1, wherein, after step (d), the microstructure of the first microstructure carrier or the microstructure of the second microstructure carrier is coated over the full area or over part of the area with at least one printing ink and/or at least one reflective coating material, the reflective coating material preferably being selected from the group consisting of metals, color-shifting systems, high-refractive materials, metal pigments and effect pigments.

15. The method according to claim 14, wherein one or several printing inks are first applied, where applicable, in overlap, and the reflective coating material is thereafter applied, the printing ink(s) and the reflective coating material covering identical and/or different regions of the microstructure.

16. The method according to claim 1, wherein,
in step (a1) a first embossed structure is formed in a first partial region of the donor foil, and a second embossed structure is formed or is present in a second partial region of the donor foil, the second embossed structure preferably being a sawtooth structure, in step (a2) the coating is applied at least to a partial region of the first embossed structure, and is applied, where applicable, also to the second embossed structure, in step (c) the donor foil is so laminated to the acceptor foil that only at least a partial region of the coated first embossed structure comes in contact with the adhesive layer of the acceptor foil, so that in step (d) there arises a microstructure carrier with a microstructure in the first partial region, said microstructure forming a first motif region, and with a microstructure in the second partial region, said microstructure forming a second motif region.

17. The method according to claim 1, wherein,
- in step (b) there is employed a second foil material having a principal area with a first partial region without an embossed structure, and with a second partial region with an embossed structure,
- in step (a1) there is formed a donor foil with elevation surfaces in a first partial region and optionally an elevation surface in a second partial region, the second partial region or, where applicable, the elevation surface in the second partial region corresponding in size and form to the area of the embossed structure of the second partial region of the second foil material,
- in step (c) the donor foil and the second foil material are so laminated to each other that the embossed structure of the second partial region of the second foil material comes in contact with the second partial region of the donor foil, and the first partial region of the second foil material comes in contact with the first partial region of the donor foil, so that
- in step (d) there arises a microstructure carrier with a microstructure in the first partial region, said microstructure forming a first motif region, and with a microstructure in the second partial region, said microstructure forming a second motif region, the first motif region and the second motif region preferably complementing each other to form a combination motif.

18. The method according to claim 16, wherein the microstructure carrier is combined with a micro-optic viewing device having microfocusing elements, the microfocusing elements being located only in the first motif region with which they form a first micro-optic representation arrangement, while the second motif region forms a second micro-optic representation arrangement.

19. The method according to claim 1, wherein, before or after step (a1), microfocusing elements are embossed into the further principal area of the first foil material opposite the principal area of the first foil material, or into an embossable layer on the further principal area of the first foil material opposite the principal area, in such a way that the microfocusing elements form a micro-optic viewing device for the second microstructure carrier arising in step (d), the micro-optic viewing device and the microstructure carrier forming a micro-optic representation arrangement.

20. The method according to claim 1, wherein, in step (b), there is used a second foil material wherein microfocusing elements are embossed into the further principal area of the second foil material opposite the principal area, or into an embossable layer on the further principal area of the second foil material opposite the principal area, in such a way that the microfocusing elements form a micro-optic viewing device for the first microstructure carrier arising in the step (d), the micro-optic viewing device and the microstructure carrier forming a micro-optic representation arrangement.

21. A security element, comprising a microstructure carrier resulting from the method recited in claim 1, or which has a micro-optic representation arrangement resulting from the method recited in claim 18.

22. The security element according to claim 21, comprising a micro-optic representation arrangement having at least one micromotif and a micromotif viewing device, the micromotif being formed by the microstructure of a microstructure carrier resulting from the method recited in claim 1 and the micromotif viewing device being formed by the microstructure of a microstructure carrier resulting from the method recited in claim 1.

23. The security element according to claim 21, wherein the micro-optic representation arrangement has at least one micromotif and a micro-optic viewing device on both sides of the micromotif.

24. The security element according to any of claim 21, wherein the micro-optic representation arrangement is a moiré magnification arrangement, a magnification arrangement of the moiré type or a modulo magnification arrangement.

25. A product comprising a security element as recited in claim 21.

* * * * *